(12) United States Patent
Kashima et al.

(10) Patent No.: US 8,124,198 B2
(45) Date of Patent: Feb. 28, 2012

(54) RETARDATION FILM AND METHOD FOR PRODUCING THE SAME, OPTICAL FUNCTIONAL FILM, POLARIZING FILM, AND DISPLAY DEVICE

(75) Inventors: Keiji Kashima, Tokyo-to (JP); Takeshi Haritani, Tokyo-to (JP); Kenji Shirai, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 991 days.

(21) Appl. No.: 11/504,468

(22) Filed: Aug. 15, 2006

(65) Prior Publication Data

US 2007/0036918 A1 Feb. 15, 2007

Related U.S. Application Data

(63) Continuation-in-part of application No. 11/038,813, filed on Jan. 19, 2005, now abandoned.

(30) Foreign Application Priority Data

Nov. 16, 2004 (JP) .................................. 2004-332515
Jan. 12, 2005 (JP) .................................. 2005-005118

(51) Int. Cl.
G02F 1/13363 (2006.01)
(52) U.S. Cl. .......................... 428/1.3; 427/164; 349/118
(58) Field of Classification Search .................. 428/1.3; 349/117–120; 427/164, 168–169
See application file for complete search history.

(56) References Cited

U.S. PATENT DOCUMENTS

| | | | |
|---|---|---|---|
| 5,243,451 A | | 9/1993 | Kanemoto et al. |
| 5,745,629 A | * | 4/1998 | Sasaki ........................... 385/122 |
| 6,281,956 B1 | | 8/2001 | Ohmuro et al. |
| 6,549,254 B1 | * | 4/2003 | Grupp et al. .................. 349/115 |
| 6,936,313 B2 | * | 8/2005 | Sakata et al. .................. 428/1.53 |
| 7,435,357 B2 | * | 10/2008 | Harding et al. ............ 252/299.1 |
| 2001/0026338 A1 | | 10/2001 | Aminaka |
| 2003/0020208 A1 | * | 1/2003 | Tasaka et al. .................. 264/217 |
| 2004/0056991 A1 | | 3/2004 | Kashima |

(Continued)

FOREIGN PATENT DOCUMENTS

EP 1 793 246 A1 6/2007

(Continued)

OTHER PUBLICATIONS

JPO Website Machine English Translation of JP 2004-309979, Sekiguchi et al., Nov. 4, 2004.*

(Continued)

*Primary Examiner* — Sophie Hon
(74) *Attorney, Agent, or Firm* — Ladas & Parry LLP

(57) ABSTRACT

The main object of the present invention is to provide a highly reliable biaxial retardation film without the problems of peeling off of the retardation layer from the base material or the like generated in the case of forming the retardation layer, capable of enlarging the range of the thickness direction and in-plane direction retardation values to be obtained, easily obtaining optional thickness direction and in-plane direction retardation values even for a small amount, a method for producing the same, an optical functional film using the retardation layer, a polarizing film and a display device.

In order to achieve the above-mentioned object, an optically biaxial retardation film, comprising a polymer film containing a material having refractive index anisotropy, wherein the material having refractive index anisotropy has a concentration gradient in a thickness direction of the polymer film, is provided.

30 Claims, 17 Drawing Sheets

U.S. PATENT DOCUMENTS

| | | |
|---|---|---|
| 2004/0063887 A1* | 4/2004 | Toyomasu et al. .......... 526/307.2 |
| 2004/0241344 A1* | 12/2004 | Kawanishi et al. ............ 428/1.1 |
| 2006/0182896 A1 | 8/2006 | Murakami et al. |

FOREIGN PATENT DOCUMENTS

| | | |
|---|---|---|
| JP | 3-67219 | 3/1991 |
| JP | 4-322223 | 11/1992 |
| JP | 10-312166 | 11/1998 |
| JP | 2000-111914 | 4/2000 |
| JP | 2000-131693 | 5/2000 |
| JP | 2001-249223 | 9/2001 |
| JP | 2002-090527 | 3/2002 |
| JP | 2003-043250 | 2/2003 |
| JP | 2003-207644 | 7/2003 |
| JP | 2004-050516 | 2/2004 |
| WO | 2004/097470 A1 | 11/2004 |

OTHER PUBLICATIONS

European Search Report: PCT/JP2005021045.
Chen, J., et al. "Optimum Film Compensation Modes for TN and VA LCDs." (1998) SID '98 Digest. pp. 315-318.
Ishinabe, T, et al. "Novel Wide Viewing Angle Polarizer with High Achromaticity." SID '00 Digest. pp. 1094-1097.

* cited by examiner

RETARDATION FILM AND METHOD FOR PRODUCING THE SAME, OPTICAL FUNCTIONAL FILM, POLARIZING FILM, AND DISPLAY DEVICE

CROSS-REFERENCE TO RELATED APPLICATIONS

This application is a continuation-in-part of U.S. Ser. No. 11/038,813 filed Jan. 19, 2005, which is now abandoned.

BACKGROUND OF THE INVENTION

1. Field of the Invention

The present invention relates to a retardation film used in a state installed in a display device such as a liquid crystal display and a method for producing the same, an optical functional film, a polarizing film and a display device.

2. Description of the Related Art

As a conventional common liquid crystal display, as shown in FIG. 22, one comprising a polarizing plate 102A on an incident side, a polarizing plate 102B on an outgoing side and a liquid crystal cell 104 can be presented. The polarizing plates 102A and 102B are constructed so as to selectively transmit only the linear polarization having an oscillation surface in a predetermined oscillation direction (shown schematically by an arrow in the figure), and are disposed facing with each other in a cross nicol state such that the oscillation directions thereof have a relationship perpendicular with each other. Moreover, the liquid crystal cell 104, including a large number of cells corresponding to pixels, is disposed in between the polarizing plate 102A and polarizing plate 102B.

Here, in such a liquid crystal display 100, for example, in the case of the liquid crystal cell 104 adopting a VA (vertical alignment) system, in which a nematic liquid crystal having a negative dielectric anisotropy is sealed (the liquid crystal director is shown schematically by a dotted line in the figure), the linear polarization transmitted through the polarizing plate 102A on the incident side is transmitted without being its phase shifted, at the time of being transmitted through a non-driven state cell part among the liquid crystal cell 104, so as to be blocked by the polarizing plate 102B on the outgoing side. In contrast, at the time of being transmitted through a driven state cell part among the liquid crystal cell 104, the phase of the linear polarization is shifted so that light of an amount according to the phase shift amount is transmitted through and outgoes from the polarizing plate 102B on the incident side. Accordingly, by optionally controlling the driving voltage of the liquid crystal cell 104 per each cell, a desired image can be displayed on the side of the polarizing plate 102B on the outgoing side. The liquid crystal display 100 is not limited to ones having the above-mentioned configuration of the light transmission and blockage. On the other hand, a liquid crystal display, in which the outgoing light from the non-driven state cell part among the liquid crystal cell 104 is transmitted through and outgoes from the polarizing plate 102B on the outgoing side, and in which the outgoing light from the driven state cell part is blocked by the polarizing plate 102B on the outgoing side, is also proposed.

Considering the case of the linear polarization transmitted through the non-driven state cell part among the liquid crystal cell 104 of the above-mentioned VA system, since the liquid crystal cell 104 have the property of double refraction so that a refractive index in the thickness direction and a refractive index in the plane direction differ with each other, incident light along the normal line of the liquid crystal cell 104, among the linear polarization transmitted through the polarizing plate 102A on the incident side, is transmitted without the phase being shifted. However, the phase of the incident light entering in an inclined direction to the normal line of the liquid crystal cell 104, among the linear polarization transmitted through the polarizing plate 102A on the incident side, is shifted when the light is transmitted through the liquid crystal cell 104 so as to be elliptically polarized. This phenomenon is derived from the liquid crystal molecules, aligned in the perpendicular direction in the liquid crystal cell 104, acting as a positive C plate. The magnitude of the retardation generated with respect to the light transmitted through the liquid crystal cell 104 (transmitted light) depends also on the double refractive value of the liquid crystal molecules sealed in the liquid crystal cell 104, the thickness of the liquid crystal cell 104, the wavelength of the transmitted light or the like.

Due to the above-mentioned phenomenon, even when a cell of the liquid crystal cell 104 is in the non-driven state so that the linear polarization is inherently transmitted as it is, so as to be blocked by the polarizing plate 102B on the outgoing side, a part of the light, outgoing in the inclined direction to the normal line of the liquid crystal cell 104, is leaked form the polarizing plate 102B on the outgoing side.

Therefore, in the above-mentioned conventional liquid crystal display 100, there is a problem of a display quality deterioration of an image observed from the inclined direction to the normal line of the liquid crystal cell 104 (a problem of the visual angle dependency), compared with an image observed from the front side, mainly due to the contrast decline.

To improve the problem of the visual angle dependency in the above-mentioned conventional liquid crystal display 100, various techniques have been developed so far. As an example, as disclosed in Japanese Patent Application Laid-Open (JP-A) Nos. 3-67219 and 4-322223, a liquid crystal display, using a retardation layer (retardation layer showing the property of double refraction) having a cholesteric regularity molecular structure, is known. By disposing such the retardation layer in between the liquid crystal cells and the polarizing plates, an optical compensation is carried out.

Here, in the retardation optical element having the cholesteric regularity molecular structure, the selective reflection wavelength, represented by $\lambda = nav \cdot p$ (p: helical pitch in a helical structure of the liquid crystal molecule, nav: average refractive index in an orthogonal plane to the helical axis), is adjusted so as to be shorter or longer than the wavelength of the transmitted light, for example as disclosed in JP-A Nos. 3-67219 or 4-322223.

In contrast, for example as disclosed in JP-A No. 10-312166, a liquid crystal display, in which the optical compensation is carried out by using a retardation layer (retardation layer showing the property of double refraction) comprising a disc like compound and by disposing such retardation layer in between liquid crystal cells and a polarizing plate, is also known.

In the above-mentioned retardation optical element, as in the case of the above-mentioned liquid crystal cells, the phase of the linear polarization incident, entering in an inclined direction to the normal line of the retardation layer, is shifted when it is transmitted through the retardation layer so as to be elliptically polarized. This phenomenon is derived from the molecular alignment of the cholesteric regularity and the disc like compound itself acting as a negative C plate. The magnitude of the retardation generated with respect to the light transmitted through the retardation layer (transmitted light) depends also on the double refractive value of the liquid crystal molecules in the retardation layer, the thickness of the retardation layer, the wavelength of the transmitted light or the like.

Therefore, by using the above-mentioned retardation layer, the problem of the visual angle dependency of the liquid crystal display can dramatically be improved by optionally designing the retardation layer such that the retardation generated in the VA system liquid crystal cells, which act as the positive C plate, and the retardation generated in the retardation layer, which act as the negative C plate, offset with each other.

In this case, the visual angle dependency of the polarizing plate can be improved, with the remaining positive plate C component and an A plate prepared separately, by making the sum of the retardation values in the thickness direction of the above-mentioned positive C plate and the above-mentioned negative C plate positive. That is, by making the absolute value of the retardation value in the thickness direction of the above-mentioned negative C plate smaller than the absolute value of the retardation value in the thickness direction of the above-mentioned positive C plate. The improvement of the visual angle dependency of the polarizing plate with the positive C plate and A plate is disclosed in, for example, J. Chen et al., SID98 Digest, p315 (1998) and T. Ishinabe et al., SID00 Digest, p1094 (2000).

However, in the above-mentioned retardation layer, there is a problem of an adhesion between the retardation layer and the base material (for example, the TAC (cellulose triacetate film) as the protecting film for the polarizing layer).

In order to solve the problem, as disclosed in for example JP-A No. 2003-207644, improvement of the adhesion, by treating the liquid crystal and the alignment film with heat, is proposed. However, in this method, when the base material is not a glass substrate but a base material having low moisture and heat resistance (for example, TAC), the base material is stretched or shrunk by the influence of the moisture so that the liquid crystal layer may be peeled off due to the above. And thus, it is not a satisfying method for base materials easily influenced by the moisture.

As a method free of the above-mentioned problems of the adhesion, for example as disclosed in JP-A Nos. 2000-111914 and 2001-249223, a method of forming a cellulose acetate film by mixing a retardation increasing agent in a cellulose acetate solution, at the time of producing a cellulose acetate film, can be adopted. However, by such method, since the retardation increasing agent should be mixed at the time of forming the cellulose acetate film, the amount of one lot is inevitably made larger. Therefore, there is a problem that it is difficult to easily obtain optional retardation for a small amount. Moreover, since the retardation increasing agent in general is hydrophobic, by mixing the same in the entirety, the front and rear surfaces of the cellulose acetate film become hydrophobic so that a problem is involved in that the adhering property at the time of laminating the retardation layer on a polarizing plate comprising a hydrophilic resin such as a polyvinyl alcohol. Furthermore, since the mixable amount of the retardation increasing agent is substantially limited, and thereby the retardation value to be obtained is limited as a result.

In contrast, use of a biaxial plate to function as a C plate and an A plate instead of using a combination of a C plate and an A plate as the compensation layer is disclosed in for example j. Chen et al., SID98 Digest, p315 (1998), T. Ishinabe et al., SID00 Digest, p1094 (2000) and Japanese Patent Application Laid-Open No. 2000-131693. However, according to the disclosed products, a problem of the limitation of the values of the thickness direction retardation and the in-plane direction retardation to be obtained and a problem of the difficulty in desirably controlling the values of the thickness direction retardation and the in-plane direction retardation independently are involved.

SUMMARY OF THE INVENTION

The present invention has been achieved in view of the above-mentioned problems, and an object thereof is to provide a highly reliable retardation film having a refractive index anisotropy without the problems of peeling off of the retardation layer from the base material or the like generated in the case of forming the retardation layer as above mentioned, capable of enlarging the range of the thickness direction and in-plane direction retardation values to be obtained, easily obtaining optional thickness direction and in-plane direction retardation values even for a small amount, and capable of improving the adhering property with a hydrophilic film such as a polarizing layer, among them in particular, a biaxial retardation film, a method for producing the same, an optical functional film using the retardation layer, a polarizing film and a display device.

In order to achieve the above-mentioned object, the present invention solves the above-mentioned problems by providing as a first aspect a retardation film which is optically biaxial, comprising a polymer film containing a material having refractive index anisotropy (hereinafter, it may be referred to also as a refractive index anisotropic material), wherein the material having refractive index anisotropy has a concentration gradient in a thickness direction of the polymer film.

Moreover, in order to achieve the above-mentioned object, the present invention solves the above-mentioned problems by providing as a second aspect a retardation film which is optically biaxial, comprising a polymer film infiltrated with a material having refractive index anisotropy.

Furthermore, in order to achieve the above-mentioned object, the present invention solves the above-mentioned problems by providing as a third aspect a retardation film, comprising a polymer film containing a material having refractive index anisotropy, and the material having refractive index anisotropy has a concentration gradient in a thickness direction of the polymer film, and the polymer film is oriented.

Moreover, in order to achieve the above-mentioned object, the present invention solves the above-mentioned problems by providing as a fourth aspect a retardation film, comprising a polymer film infiltrated with a material having refractive index anisotropy, and the polymer film is oriented.

In the present invention, for example, by coating a coating solution in which a refractive index anisotropic material is dissolved in a solvent, on the surface of a polymer film so as to swell the polymer film for infiltrating with the refractive index anisotropic material, it is possible to easily fill the vicinity of the polymer film surface with the refractive index anisotropic material. Thereby, a retardation film having concentration gradient of the refractive index anisotropic material in a direction of the above-mentioned polymer film thickness, can be obtained. Furthermore, by for example orienting the retardation film, or by coating a coating solution in which a refractive index anisotropic material is dissolved in a solvent on the surface of a preliminarily oriented polymer film, a retardation film which is optically biaxial can be obtained.

In the present invention, by changing the amount or the concentration of the above-mentioned coating solution, the retardation value mainly in the thickness direction, and furthermore, in the in-plane direction as the retardation film can easily be changed. Moreover, according to the above-mentioned stretching direction, the stretching ratio, or the like, the retardation value mainly in the in-plane direction, and furthermore, in the thickness direction as the retardation film can easily be changed. Therefore, there is an advantage that the ranges of the thickness direction and in-plane direction retardation values to be obtained can be enlarged, the values of the thickness direction retardation and the in-plane direction retardation can desirably controlled independently with ease, and furthermore, a retardation film having the optional thickness direction and in-plane direction retardation values can easily be obtained in a small lot. Moreover, according to the present invention, since it is not a conventional retardation film produced by laminating a retardation layer as another layer on a base material so as to be laminated and formed, a problem of the peeling off of the retardation layer from the base material is not generated, and thus there is an advantage that the reliability such as the heat resistance and the water resistance (durability in term of the delamination with respect to repetition of the coldness and the heat in the use environment or contact with water), the alkaline resistance (saponification resistance), and the reworking property (repeated usability) can be improved.

According to the above-mentioned retardation films of the first and second aspects, it is preferable that the above-mentioned polymer film is oriented. By orienting a retardation film having a concentration gradient of the refractive index anisotropic material in the thickness direction of the polymer film, or by coating a coating solution in which a refractive index anisotropic material is dissolved in a solvent on the surface of the polymer film preliminarily oriented, a retardation film which is optically biaxial can easily be obtained.

Moreover, according to the above-mentioned retardation films of the first, second, third and fourth aspects of the present invention, it is preferable to have refractive indices satisfying the condition of nx>ny>nz, wherein nx is a refractive index along a slow axis in the in-plane direction of the film, ny is a refractive index along a fast axis in the in-plane direction of the film, and nz is a refractive index along a thickness direction of the film. In the case such a biaxial property is provided, a retardation film having the optical characteristics as a combination of those of the A plate and the negative C plate can be obtained. In this case, both the A plate and the negative C plate need not be prepared as the compensation layers.

Furthermore, according to the above-mentioned retardation films of the first, second, third and fourth aspects of the present invention, a direction of a principal refractive index of the above-mentioned film may be inclined with respect to in-plane directions of the film and a thickness direction of the film. In this case, the view angle improving effect can be improved corresponding to further various applications and design demands so that the designing freedom can be widened as well.

According to the above-mentioned retardation films of the first, second, third and fourth aspects of the present invention, it is preferable that the above-mentioned polymer film has regularity in the refractive index. By using such a polymer film, the refractive index regularity of the polymer film can be reinforced by the refractive index anisotropic material to be filled, so that a retardation film having various characteristics can be obtained.

Moreover, according to the above-mentioned retardation films of the first, second, third and fourth aspects of the present invention, it is preferable that the refractive index anisotropic material is a material having liquid crystallinity. With the material having the liquid crystallinity, a liquid crystal structure may be provided when the material is filled in the polymer film, so that the effect can be imparted effectively to the polymer film.

Furthermore, according to the above-mentioned retardation films of the first, second, third and fourth aspects of the present invention, it is preferable that the molecular structure of the refractive index anisotropic material is in a shape of a rod. By using the refractive index anisotropic material having a structure in the shape of a rod, the refractive index regularity of the above-mentioned polymer film can be reinforced.

Moreover, according to the above-mentioned retardation films of the first, second, third and fourth aspects of the present invention, it is preferable that the refractive index anisotropic material has a polymerizable functional group. By polymerizing the refractive index anisotropic material with use of the polymerizable functional group, after filling the polymer film with the refractive index anisotropic material, exudation of the refractive index anisotropic material, after the retardation film is formed, can be prevented so that a stable retardation film can be provided.

Furthermore, according to the above-mentioned retardation films of the first, second, third and fourth aspects of the present invention, it is preferable that the material having refractive index anisotropy comprises a material having a polymerizable functional group and a material having no a polymerizable functional group. In the case the material having a polymerizable functional group and the material having no polymerizable functional group are included, the retardation function can be further reinforced by the material having no polymerizable functional group, and the film reliability can be improved by the material having a polymerizable functional group.

According to the above-mentioned retardation films of the first, second, third and fourth aspects of the present invention, it is preferable that the concentration gradient of the material having refractive index anisotropy in a thickness direction of the polymer film has high concentration on one surface side of the polymer film and becomes low concentration toward the other surface side. With such configuration, since the influence on the nature inherent to the polymer film by containing or infiltrating with the material having refractive index anisotropy is absent or little as to the low concentration side surface side, for example, in the case of providing a polarizing film by directly laminating a polarizing layer on the retardation film, by laminating the polarizing layer on the low concentration side, specifically, on the surface side, on which the refractive index anisotropic material is not filled, a polarizing film can be obtained without the adhesion being interrupted.

According to the above-mentioned retardation films of the first, second, third and fourth aspects of the present invention, it is preferable that contact angels of the retardation film to pure water are different between one surface and the other surface, in the case where the concentration gradient of the material having refractive index anisotropy in a thickness direction of the polymer film has high concentration on one surface side of the polymer film and becomes low concentration toward the other surface side. With such configuration, in the case of providing a polarizing film by for example directly laminating a hydrophilic resin based polarizing layer having a PVA base material on the retardation film, if the polarizing layer is laminated on the surface having a lower contact angle, a polarizing film can be obtained without inhibiting the adhesion even in the case a water based adhesive is used.

According to the above-mentioned retardation films of the first, second, third and fourth aspects of the present invention, the concentration gradient of the material having refractive index anisotropy in a thickness direction of the polymer film has high concentration on both surface sides of the polymer film and becomes low concentration toward a central part. With such configuration, for example, in the case of filling only one surface side with the refractive index anisotropic material, even if the retardation value is insufficient, by making the both surface sides of the polymer film having high concentration, that is, by filling the both surface sides with the refractive index anisotropic material, a sufficient retardation value can be provided.

According to the above-mentioned retardation films of the first, second, third and fourth aspects of the present invention, it is preferable that the concentration gradient of the material having refractive index anisotropy in a thickness direction of the polymer film varies continuously. In this case, since the stress concentration to a specific interface in the film can be eliminated, the peeling strength is strengthened so that the reliability such as the heat resistance and the water resistance, the alkaline resistance, the reworking property can be improved.

Moreover, according to the above-mentioned retardation films of the first, second, third and fourth aspects of the present invention, it is preferable to have a region in which the concentration gradient of the material having refractive index anisotropy is gentle and a region in which the concentration gradient of the material having refractive index anisotropy is steep. In this case, the reliability can be improved while providing a desired retardation owing to reinforcement of the retardation and reinforcement of the peeling strength, the heat resistance and the water resistance. By concentrating a sufficient amount of the material having refractive index anisotropy in a high concentration region having a gentle concentration gradient, a sufficient retardation value can be ensured, and furthermore, by linking continuously the concentrations from the high concentration region to the low concentration region in the steep concentration gradient region, the stress concentration to a specific interface in the film can be prevented.

Moreover, according to the above-mentioned retardation films of the first, second, third and fourth aspects of the present invention, it is preferable to have a region which contains no material having refractive index anisotropy. Since the nature of the polymer film remains as it is in the region which contains no refractive index anisotropic material, for example the preferable adhesion of the polymer film itself can be utilized. Furthermore, although the retardation reinforcing region containing the refractive index anisotropic material may have the strength weakened, since the region which contains no refractive index anisotropic material is provided as mentioned above, the strength as the retardation film can be maintained, and thus it is advantageous.

According to the above-mentioned retardation films of the first, second, third and fourth aspects of the present invention, it is preferable to show a thickness direction retardation of 100 to 300 nm and a in-plane retardation of 10 to 150 nm, wherein the thickness direction retardation is represented by the following Rth, $Rth[nm]=\{(nx+ny)/2-nz\} \times d$, and the in-plane direction retardation is represented by the following Re, $Re[nm]=(nx-ny) \times d$, wherein nx is a refractive index along a slow axis in the in-plane direction of the film, ny is a refractive index along a fast axis in the in-plane direction of the film, nz is a refractive index along a thickness direction of the film and d is the thickness of the film. In the present invention, the ranges of the thickness direction and in-plane direction retardation values to be substantially obtained can be enlarged, and in this case the view angle improving effect can be improved.

Moreover, according to the above-mentioned retardation films of the first, second, third and fourth aspects of the present invention, it is preferable to show an in-plane direction retardation of 10 to 150 nm and has a haze value of 1% or less measured in accordance with JIS-K7136. In this case, the view angle improving effect can be improved without disturbing the polarizing state.

According to the above-mentioned retardation films of the first, second, third and fourth aspects of the present invention, it is preferable that the retardation value, in the visible light range, of the retardation film on the shorter wavelength side is larger than that of the longer wavelength side. In general, the retardation value of a liquid crystal material used for a liquid crystal layer of a liquid crystal display, in the visible light range, on the shorter wavelength side is larger than that of the longer wavelength side. Therefore, in the case of using the retardation film of the present invention as, for example, an optical compensating plate, there is an advantage that the compensation can be carried out in the all wavelength range in the visible light range.

On the other hand, according to the above-mentioned retardation films of the first, second, third and fourth aspects of the present invention, the retardation value, in the visible light range, of the retardation film on the longer wavelength side may be larger than that of the shorter wavelength side. In this case, when the retardation film of the present invention is used as, for example, a polarizing plate in a state laminated on a polarizing film, it is advantageous in that the excellent light leakage compensation can be provided, and thus it is preferable.

Furthermore, according to the present invention, it is preferable that the above-mentioned retardation films of the first, second, third and fourth aspects of the present invention are capable of being rolled into a cylindrical form having a minimum diameter of 6 inches or less. It is preferable that the retardation film is formed into a long continuous film (also referred to as a web) and is rolled on a cylinder so as to be in a form of roll at the time of storage, transportation and standby for a process, other than production, inspection and post process) in order to improve the mass productivity and the production yield.

Moreover, according to the present invention, the above-mentioned retardation films of the first, second, third and fourth aspects of the present invention may comprise two or more sheets of the single layer retardation film laminated together. Thereby, a large retardation value (optical anisotropic value) not to be realized by only one film can be realized, or a complicated optical anisotropy not to be realized by only one film can be realized.

Further, the present invention provides an optical functional film, comprising the above mentioned retardation film directly laminated to an optical functional layer other than a retardation film. Since the optical functional film of the present invention has both a function such as optical compensation included in the retardation film of the invention, and another function such as antireflection, there is an advantage that it is not necessary to separately provide the film having each function.

Moreover, the present invention provides a polarizing film comprising the above-mentioned retardation film directly laminated to a polarizing layer. A polarizing film is usually used with protecting films laminated on the both surfaces of the polarizing layer. However, in the present invention, since one of the protecting films can be substituted by the above-mentioned retardation film, for example, when additional optical compensating plate is required for a display device or the like, there is an advantage that other optical compensating plate is not needed to be provided by using the polarizing film of the present invention.

Furthermore, the present invention provides a display device, wherein any of the retardation film, the optical functional film and the polarizing film according to the present invention as mentioned above is disposed in a light path of the display device. Since the retardation film having an appropriate retardation without the problem of peeling off or the like is disposed, a highly reliable display device having the excellent display quality can be obtained. Moreover, since the optical functional film according to the present invention is disposed, a display device having the excellent display quality without the need of providing both the optical functional layer and the retardation layer can be obtained. Furthermore, since the polarizing film according to the present invention is disposed, a highly reliable display device having the excellent display quality without the need of additionally providing an optical compensation plate can be obtained.

Furthermore, the present invention provides a method for producing a retardation film comprising: a coating process of coating a retardation reinforcing region forming coating solution, in which a material having refractive index anisotropy is dissolved or dispersed in a solvent, on at least one surface of a polymer film; an infiltration process of infiltrating the material having the refractive index anisotropy, in the retardation reinforcing region forming coating solution coated in the coating process, into the polymer film; a drying process of drying the solvent in the retardation reinforcing region forming coating solution coated in the coating process; and an orientation process of orienting the polymer film. In the present invention, a retardation film can be formed easily by coating the above-mentioned retardation reinforcing region forming coating solution. And also, the retardation value mainly in the thickness direction, and furthermore, in the in-plane direction of the obtained retardation film can be changed only by changing the coating amount or the like of the above-mentioned retardation reinforcing region forming coating solution. Furthermore, by changing the stretching direction, the stretching ratio, or the like in the orientation process, the retardation value mainly in the in-plane direction, and furthermore, in the thickness direction of the obtained retardation film can easily be changed. Therefore, the range of the obtained thickness direction and in-plane direction retardation values can be enlarged. Furthermore, there is an advantage that a retardation film having optional thickness direction and in-plane direction retardation values can be obtained easily by a small lot.

According to the present invention, the above-mentioned infiltration process may be carried out during the above-mentioned drying process. By adjusting the drying temperature or the like, the refractive index anisotropic material can be infiltrated in the polymer film during the drying operation. Moreover, according to the control of the drying conditions, the infiltration degree of the refractive index anisotropic material, and furthermore, the refractive index anisotropy (retardation value) may be controlled.

Furthermore, according to the present invention, it is preferable that a fixing process of fixing the refractive index anisotropic material infiltrated into the polymer film is provided after the above-mentioned drying process. By the fixation, exudation of the refractive index anisotropic material from the surface after the production can be prevented so that the stability of the retardation film can be improved.

According to the present invention, the above-mentioned orientation process of orienting the polymer film may be carried out after the above-mentioned fixing process. In this case, since the refractive index anisotropic material in the polymer film is fixed so as to orient a highly stable film, there is an advantage that irregularity of the refractive index anisotropy realization degree due to irregularity of the orienting conditions can be made smaller so as to facilitate stabilization of the refractive index anisotropy.

Moreover, according to the present invention, the above-mentioned orientation process of orienting polymer film may be carried out after the above-mentioned drying process. By orienting the polymer film after infiltrating the refractive index anisotropic material in the polymer film and drying, the retardation of the film mainly in the in-plane direction, and furthermore, in the thickness direction can be changed in a desired direction and by a desired amount.

According to the present invention, the above-mentioned orientation process of orienting the polymer film may be carried out after the above-mentioned drying process, and furthermore, a fixing process of fixing the refractive index anisotropic material infiltrated into the polymer film may be provided after the orientation process. In the case of orienting before fixing the refractive index anisotropic material accordingly, the retardation value change of the retardation film can be made larger in the orientation process.

Moreover, according to the present invention, the above-mentioned coating process of coating the retardation reinforcing region forming coating solution may be carried out after the above-mentioned orientation process of orienting the polymer film. Also in this case, the retardation values in both the in-plane direction and the thickness direction can be reinforced, and there is an advantage that the orientation reversion can be reduced in the high temperature high humidity test to be carried out later by coating and infiltrating the refractive index anisotropic material after the orientation process compared with those oriented after the coating process.

The retardation film of the present invention has the following advantageous effects: problems such as the peeling off of the retardation layer from the base material, occurred in forming the retardation layer, are not generated so that the reliability such as the heat resistance and the water resistance, the alkaline resistance and the reworking property can be improved; in comparison to the conventional retardation film which is optically biaxial, the ranges of the thickness direction and in-plane direction retardation values to be achieved can be enlarged, and the values of the thickness direction retardation and the in-plane direction retardation can be desirably controlled independently with ease; and a retardation film having a discretional optical thickness direction and in-plane direction retardation values can easily be obtained in a small lot. Moreover, since the retardation layer of the invention is capable of improving the adhering property with a hydrophilic film such as a polarizing layer while also excellent in the alkaline resistance, the layer is suitable for laminating directly to a polarizing layer.

DESCRIPTION OF THE PREFERRED EMBODIMENT

The present invention includes a retardation film, an optical functional film and a polarizing film using the same, a display device, and furthermore, a method for producing a retardation film. Hereinafter, each of them will be explained in detail.

A. Retardation Film

First, a retardation film of the present invention will be explained.

The retardation film according to the first aspect of the present invention is a retardation film which is optically biaxial, comprising a polymer film containing a material having refractive index anisotropy, wherein the material having refractive index anisotropy has a concentration gradient in a thickness direction of the polymer film.

The retardation film according to the second aspect of the present invention is a retardation film which is optically biaxial, comprising a polymer film infiltrated with a material having refractive index anisotropy.

Moreover, the retardation film according to the third aspect of the present invention is a retardation film comprising a polymer film containing a material having refractive index anisotropy, and the material having refractive index anisotropy has a concentration gradient in a thickness direction of the polymer film, wherein the polymer film is oriented.

Furthermore, the retardation film according to the fourth aspect of the present invention is a retardation film comprising a polymer film infiltrated with a material having refractive index anisotropy, wherein the polymer film is oriented.

Figure 1:
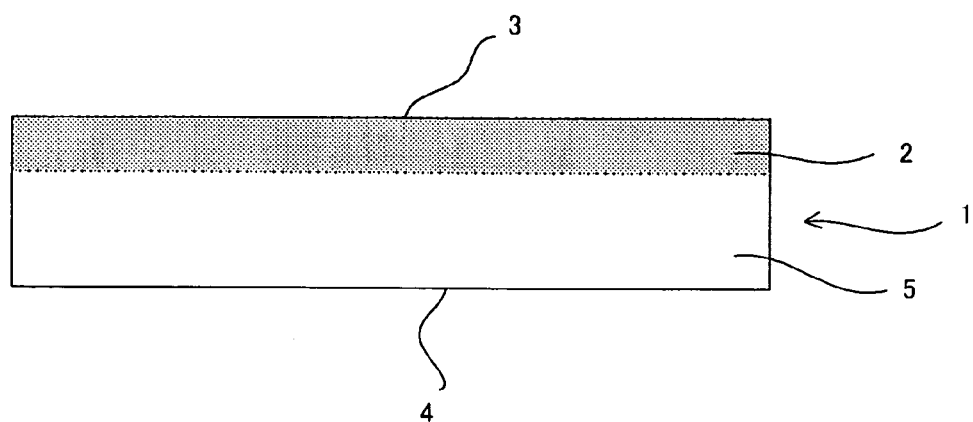
FIG. 1 is a schematic cross sectional view showing an example of a retardation film of the present invention.

FIG. 1 is a cross sectional view showing an example of the retardation film of the present invention. In the example shown in FIG. 1, a retardation reinforcing region 2 containing a refractive index anisotropic material is formed on one surface side of a polymer film 1. A concentration gradient of the refractive index anisotropic material in this case is high concentration on the surface 3 side, on which the retardation reinforcing region 2 is formed. The refractive index anisotropic material is not contained on the surface 4 side, on which the retardation reinforcing region 2 is not formed. The concentration gradient in the present invention includes a case, as mentioned above, in which the refractive index anisotropic material is present in some region and is not present in other region as long as the concentrations are different in optional two points in the thickness direction.

Since the retardation film of the present invention preferably has the biaxial property and the retardation reinforcing region with the refractive index anisotropic material present is formed in the retardation film as mentioned above so that the retardation reinforcing region reinforces the function as the retardation layer, various optical functions can be provided based on the property of double refraction. For example, as it will be described later, in the case of using a TAC (cellulose triacetate), which acts as a negative C plate, as the polymer film, using a liquid crystal material having a structure in the shape of a rod as the refractive index anisotropic material, and orienting in the film in-plane direction at any point in time, since the film further provides the function as an A plate, the above-mentioned retardation reinforcing region reinforces the function as the negative C plate and A plate. Therefore, the retardation film of the present invention has the functions as the negative C plate and A plate further reinforced with one film.

In the retardation film of the present invention, as it will be explained in detail in the column of the "B. Method for producing a retardation film", the retardation reinforcing region can be formed easily, for example, only by coating the retardation reinforcing region forming coating solution, in which the above-mentioned refractive index anisotropic material is dissolved or dispersed, infiltrating the refractive index anisotropic material into the surface of the polymer film so as to be filled in the polymer film, and orienting the same at any point in time. Therefore, by changing the amount or the concentration of the above-mentioned coating solution, the retardation value of the retardation film mainly in the thickness direction and furthermore in the in-plane direction can be changed easily. Furthermore, according to the above-mentioned stretching direction, the stretching ratio, or the like, the retardation value of the retardation film mainly in the in-plane direction and furthermore in the thickness direction can easily be changed. Therefore, the retardation value in the thickness direction and the in-plane direction can be realized in a range which has not conventionally been obtained, and even when a compensating plate having various kinds of retardation values is needed in a small lot, or the like, a retardation film can be obtained easily at a low cost, and thus it is advantageous.

Moreover, as mentioned above, in the retardation film of the present invention, unlike with the conventional ones produced by laminating a retardation layer as another layer on a base material so as to be laminated and formed, since the retardation reinforcing region filled with the refractive index anisotropic material and the base material region without being filled therewith are formed in the retardation film, the conventional problem of the peeling off of the retardation layer can be prevented, the reliability in terms of the heat resistance, the water resistance (durability in term of the delamination with respect to repetition of the coldness and the heat in the use environment or contact with water), or the like can be improved so as to be used stably. Furthermore, since the alkaline resistance can be improved, it can endure the saponification process at the time of for example adhering to a polarizing layer. Moreover, since the excellent reworking property (repeated usability) is provided, a good yield is provided in the process, and thus it is advantageous.

Hereinafter, each configuration of the retardation film of the present invention will be explained in detail.

1. Polymer Film

A polymer film used in the present invention is not particularly limited. In general, those made of a resin capable of transmitting a light in the visible light range is used preferably. Here, to transmit the light in the visible light range is that an average light transmittance in the visible light range of 380 to 780 nm is 50% or more, preferably 70% or more, and particularly preferably 85% or more. For the light transmittance, a value measured by an ultraviolet-visible spectrophotometer (for example, UV-3100PC manufactured by Shimadzu Corporation) at a room temperature in the atmosphere is used.

As the polymer film used in the present invention, those having the refractive index regularity are preferable. That is, as the polymer film used in the present invention, those having the in-plane direction retardation and/or the thickness direction retardation are preferable. Although it is not yet clear, it is assumed that the retardation film in the present invention performs the function as an optical functional film such as an optical compensating plate, by obtaining a larger retardation value, for the following reasons. That is, it is assumed that, when the refractive index anisotropic material is filled in the polymer film, the filled refractive index anisotropic material reinforces the refractive index regularity, such as the property of double refraction, inherent to the polymer film, and thereby, a retardation film having various characteristics can be obtained. Therefore, as the polymer film used in the present invention, those having some kind of refractive index regularity are used preferably. The refractive index regularity of the polymer film may be provided preliminarily before filling the polymer film with the refractive index anisotropic material, or it may be provided by orienting or the like after filling.

The refractive index regularity in the present invention is that, for example, (1) the polymer film acts as the negative C plate, (2) the oriented polymer film has the characteristics of a negative C plate, a positive C plate, an A plate, or a biaxial plate, or the like.

Moreover, in the present invention, as it will be described in detail in the column of the "C. Method for producing a retardation film", it is preferable that the polymer film has high swelling degree to predetermined solvents. That is because the above-mentioned refractive index anisotropic material is infiltrated and filled in the polymer film by coating the retardation reinforcing region forming coating solution, in which the refractive index anisotropic material is dissolved or dispersed in a solvent, onto the surface of the polymer film and swelling by the solvent. Specifically, it is preferable that the polymer film is swelled when the polymer film is soaked in a certain solvent. This phenomenon can be judged visually. For example, the swelling property to a solvent can be checked by forming a polymer film (film thickness: several μm), dropping a solvent thereon, and observing the infiltration condition of the solvent.

The polymer film of the present invention may be a flexible material with the flexibility or a rigid material without the flexibility. It is preferable to use the flexible material since the material allows using the roll-to-roll process in the retardation film producing process, and thereby a retardation film excellent in productivity can be obtained.

As examples of materials for constituting the flexible material, a cellulose based resin, a norbornene based polymer, a polymethylmethacrylate, a polyvinyl alcohol, a polyimide, a polyalylate, a polyethylene terephthalate, a polysulphone, a polyether sulphone, an amorphous polyolefine, a modified acrylic polymer, a polystyrene, an epoxy resin, a polycarbonate, and polyesters can be cited. In the present invention, the cellulose based resin and the norbornene based polymer can be suitably used.

As the norbornene based polymer, cycloolefin polymer (COP) or cycloolefin copolymer (COC) can be cited. In the invention, the cycloolefin polymer is preferably used since its low moisture absorbability and permeability enable the retardation film of the invention to be excellent in temporal stability of optical characteristics when the polymer film of the invention is constituted by the cycloolefin polymer.

As the specific examples of the cycloolefin polymer used in the invention, ARTON (product name) manufactured by JSR Corporation, ZEONOR® (product name) manufactured by ZEON CORPORATION and the like can be cited.

As the cellulose based resin, a cellulose ester is preferable. Among the cellulose esters, the cellulose acylates are more preferable since they are commercially widely used and thus advantageous in its easy availability.

As the cellulose acylates, lower fatty acid ester having 2 to 4 carbon atoms is preferable. As the lower fatty acid ester, a lower fatty acid ester such as a cellulose acetate which contains only a single lower fatty acid ester, or a lower fatty acid ester such as a cellulose acetate butilate or a cellulose acetate propionate which has a number of fatty acid esters may be exemplified.

Among the lower fatty acid esters, the cellulose acetate is particularly preferably used in the present invention. As the cellulose acetate, a cellulose triacetate with an average degree of acetification 57.5 to 62.5% (degree of substitution: 2.6 to 3.0) is most preferably used. Here, the degree of acetification denotes an amount of the bound acetic acid per cellulose unit mass. It can be measured and calculated from the degree of acetylization obtained by ASTM: D-817-91 (a testing method of the cellulose acetate or the like).

The polymer film used in the present invention may be treated with the stretching process. This is because the stretching process may sometimes make the refractive index anisotropic material easy to be infiltrated in the polymer film. Such stretching process is not particularly limited to one kind and can be decided in accordance with the material constituting the polymer film or other members. A uniaxial stretching process and biaxial stretching process can be cited as examples of the stretching process.

The configuration of the polymer film of the invention is not limited to a single layer configuration and may be a configuration with a number of layers laminated. In case it is the configuration with a number of layers laminated, the layers may be of the same composition or of different compositions.

The film thickness of the polymer film used in the present invention is not particularly limited, and it can be selected optionally. Therefore, the film referred to in the present invention is not limited to the so-called film in a narrow sense but it includes also those having the film thickness in a range of the so-called sheets and plates. However, in general those having a relatively thin film thickness are used. As to the film thickness, those generally in a range of 10 µm to 200 µm, and in particular in a range of 20 µm to 100 µm can be used preferably.

Moreover, an oriented polymer film tends to be shrunk (orientation reversion) due to the heat applied at the time of the post process such as the lamination onto the polarizing layer during the retardation film producing process or before the producing process. In this case, the retardation value may be fluctuated according to the shrinkage. In order to prevent the same, it is preferable to release or alleviate the residual stress capable of shrinking the polymer film by the heating process (annealing) after orienting. The temperature condition of the heating process is preferably a temperature from the glass transition temperature of the polymer film to the fusing temperature (or the melting point) thereof in general.

2. Refractive Index Anisotropic Material

Next, the refractive index anisotropic material used in the present invention will be explained. The refractive index anisotropic material used in the present invention is not particularly limited as long as it is a material capable of filling the polymer film, and also, having a property of double refraction.

In the present invention, a material having relatively small molecular weight is used preferably because it is easily filled in the polymer film. Specifically, a material having a molecular weight in a range of 200 to 1200, in particular, in a range of 400 to 800 is used preferably. The molecular weight here refers to the molecular weight before polymerization for the below mentioned refractive index anisotropic material having a polymerizable functional group to be polymerized in the polymer film.

As the refractive index anisotropic material used in the present invention, it is preferable that the molecular structure of the material is in a shape of a rod. That is because the material in a shape of a rod can get into a gap in the polymer film relatively easily.

Moreover, it is preferable that the refractive index anisotropic material used in the present invention is a material having a liquid crystallinity (liquid crystalline molecules). If the refractive index anisotropic material is the liquid crystalline molecules, when the refractive index anisotropic material is filled in the polymer film, it can be in a liquid crystalline state in the polymer film so that the property of double refraction of the refractive index anisotropic material can be reflected to the retardation film more effectively.

In the present invention, as the refractive index anisotropic material, a nematic liquid crystalline molecule material, a cholesteric liquid crystalline molecule material, a chiral nematic liquid crystalline molecular material, a smectic liquid crystalline molecule material, and a discotic liquid crystalline molecule material can be used. Among them, it is preferable that the refractive index anisotropic material is the nematic liquid crystalline molecule material. In the case of the nematic liquid crystalline molecule material, since several to several hundreds of the nematic liquid crystalline molecules, which have entered into the gap in the polymer film, are aligned in the polymer film, the refractive index anisotropy can be realized more certainly. It is particularly preferable that the above-mentioned nematic liquid crystalline molecule is a molecule having spacers on both mesogen ends. Since the nematic liquid crystalline molecule having spacers on both mesogen ends has flexibility, white turbidity, when getting into the gap in the polymer film, can be prevented.

As the refractive index anisotropic material used in the present invention, those having a polymerizable functional group in the molecule are used preferably. In particular, those having the polymerizable functional group, which can be three-dimensionally cross-linked, are preferable. If those having the polymerizable functional group are used, the refractive index anisotropic material can be polymerized (cross-linked) in the polymer film, after being filled in the polymer film, by the function of the radical generated from a photo-polymerization initiator due to a light irradiation, by the function of the electron beam or the like. Therefore, problems, such as exudation of the refractive index anisotropic material after being formed as the retardation film, can be prevented so that a retardation film which can be used stably can be provided.

The "three-dimensionally cross-link" means a state that the liquid crystalline molecules are polymerized three dimensionally with each other so as to be a mesh (network) structure.

The polymerizable functional group is not particularly limited, and various kinds of polymerizable functional groups to be polymerized by a function of the ionizing radiation such as the ultraviolet ray and the electron beam, or heat, can be used. As the representative examples of the polymerizable functional group, a radical polymerizable functional group, a cationic functional group, or the like can be presented. Furthermore, as the representative examples of the radical polymerizable functional group, a functional group having at least one ethylenically unsaturated double bond capable of addition polymerization can be presented. As the specific examples thereof, a vinyl group, an acrylate group (it is the general term including an acryloyl group, a methacryloyl group, an acryloyloxy group, and a methacryloyloxy group) or the like, with or without a substituent, can be presented. Further, as a specific example of a cationic polymerizable functional group, an epoxy group, or the like can be presented. Additionally, as the polymerizable functional groups, for example, an isocyanate group, an unsaturated triple bond, or the like can be presented. Among them, in terms of the process, a functional group having an ethylenically unsaturated double bond can be used preferably.

In the present invention, among the above, a liquid crystalline molecule, whose molecular structure is in a shape of a rod, and having the above-mentioned polymerizable functional group on its end can be used particularly preferably. For example, by using a nematic liquid crystalline molecule having polymerizable functional groups on both ends, they can be polymerized with each other three-dimensionally so as to provide a mesh (network) structure state. Therefore, a stronger polymer film can be obtained.

Specifically, a liquid crystalline molecule having an acrylate group on its end can be used preferably. The specific examples of the nematic liquid crystalline molecule having an acrylate group on its end will be shown by the below-mentioned chemical formulae (1) to (6).

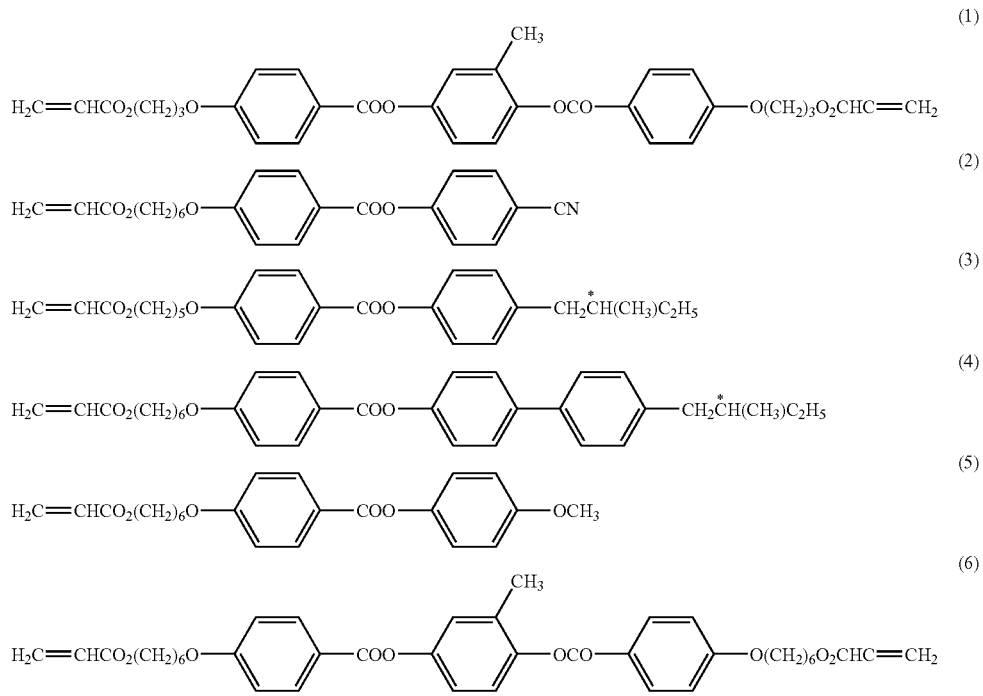

Here, the liquid crystalline molecules represented by the chemical formulae (1), (2), (5) and (6) can be prepared according to the methods disclosed in Makromol Chem. 190, 3201-3215 (1989) by D. J. Broer, et al. or Makromol Chem. 190, 2250 (1989) by D. J. Broer, et al., or a method similar thereto. Moreover, the preparation of the liquid crystalline molecules represented by the chemical formulae (3) and (4) is disclosed in DE 195,04,224.

Moreover, as the specific examples of the nematic liquid crystalline molecules having an acrylate group on its end, those represented by the below-mentioned chemical formulae (7) to (17) can also be presented.

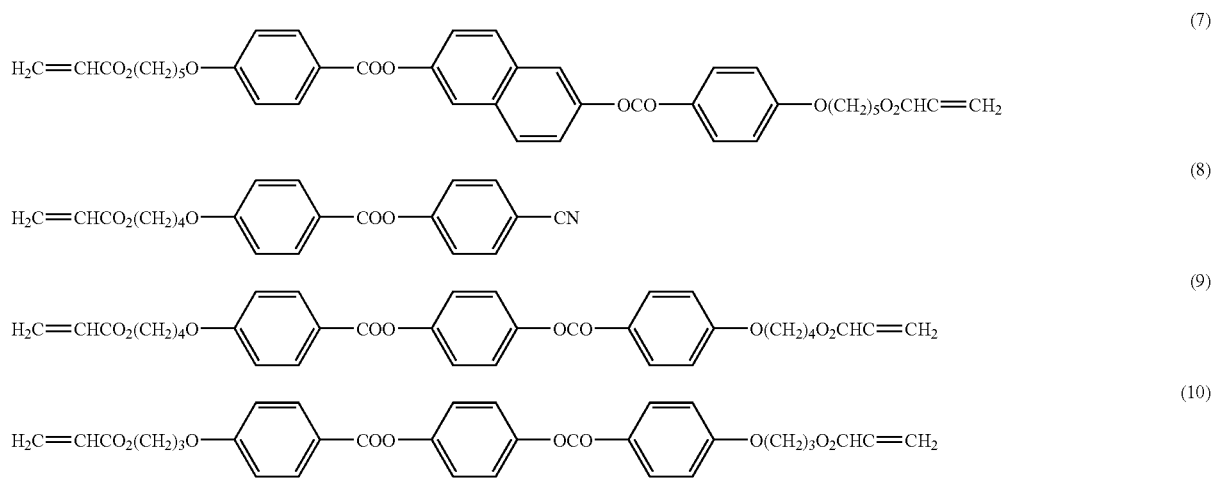

-continued

(11)

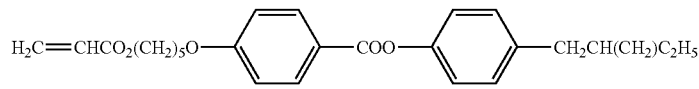
(12)

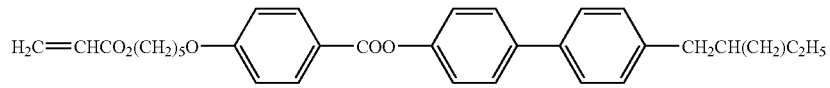
(13)

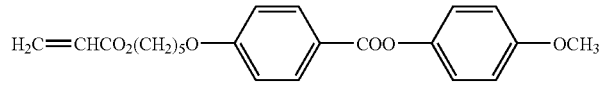
(14)

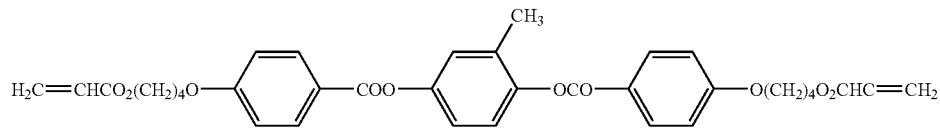
(15)

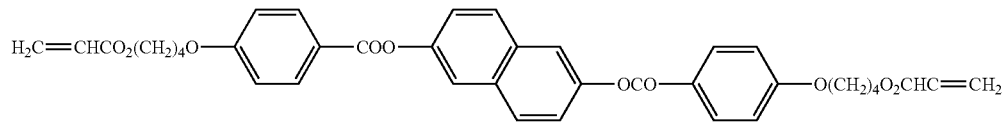
(16)

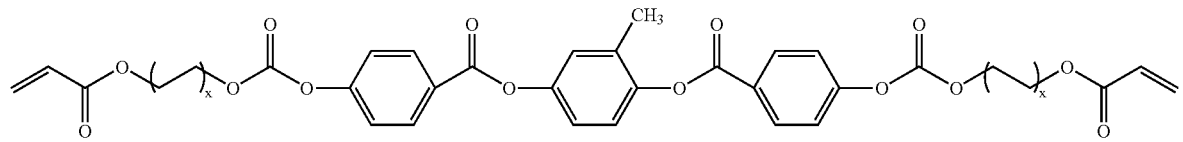
(17)

x is the inteaer of 2 to 5.

In the present invention, the refractive index anistropic material may be used by two or more kinds. For example, in the case the refractive index anisotropic material includes a liquid crystalline molecule having one or more polymerizable functional group on the both ends with a molecular structure in a shape of a rod, and a liquid crystalline molecule having one or more polymerizable functional group on one end with a molecular structure in a shape of a rod, the polymerization density (cross linking density) and the retardation function can be adjusted preferably according to the adjustment of the composition ratio thereof, and thus it is preferable.

A rod like liquid crystalline molecule having one or more polymerizable functional group on one end can easily be infiltrated in the polymer film and/or oriented in the polymer film, the retardation function can easily be reinforced. On the other hand, since the polymerization density can be made higher by the rod like liquid crystalline molecule having one or more polymerizable functional group on the both ends, the endurance such as the molecule exudation preventing property, the solvent resistance and the heat resistance can be provided.

Moreover, as the refractive index anisotropic material used in the present invention, in terms of further reinforcing the retardation function and improving the film reliability, it is preferable to use a liquid crystalline molecule having a rod like molecular structure and having the polymerizable functional group, and a liquid crystalline molecule having a rod like molecular structure and having no polymerizable functional group. In particular, it is preferable to use a liquid crystalline molecule having a rod like molecular structure and having one or more of the polymerizable functional groups on the both ends, a liquid crystalline molecule having a rod like molecular structure and having one or more of the above-mentioned polymerizable functional groups on one end and a liquid crystalline molecule having a rod like molecular structure and having no polymerizable functional groups on the both ends. Since the rod like liquid crystalline molecule having no polymerizable functional group can easily be infiltrated in the polymer film and/or oriented in the polymer film, the retardation function can further be reinforced. On the other hand, by mixing the rod like liquid crystalline molecule having a polymerizable functional group so as to be able to polymerize between the molecules, the endurance such as the molecule exudation preventing property, the solvent resistance and the heat resistance can be provided.

3. Concentration Gradient

In the present invention, the above-mentioned refractive index anisotropic material is characterized in that it has a concentration gradient in the thickness direction of the above-mentioned polymer film.

In the present invention, the concentration gradient is not particularly limited as long as the concentrations at optional two points in the thickness direction differ with each other. In the present invention, there are two preferable embodiments: an embodiment that the concentration gradient of the refractive index anisotropic material is high concentration on one surface side of the polymer film, and becomes low concentration toward the other surface side (first embodiment); and an embodiment that the concentration gradient of the refractive index anisotropic material is high concentration on the both surface sides of the polymer film, and becomes low concentration toward the central part (second embodiment). However, the concentration gradient of the refractive index anisotropic material may be low concentration on surface side and may have a high concentration region in the polymer film. Hereinafter, each embodiment will be explained.

(1) First Embodiment

The first embodiment of the present invention is an embodiment that the concentration gradient of the refractive index anisotropic material is high concentration on one surface side of the polymer film, and becomes low concentration toward the other surface side. The first embodiment is shown schematically in FIG. 1. As shown in FIG. 1, in this embodiment, a retardation reinforcing region 2 containing the refractive index anisotropic material is formed on one surface side 3 of a polymer film 1. And a base material region 5 is formed on the other surface side 4 of the opposite side.

The retardation reinforcing region is produced by containing or infiltrating the refractive index anisotropic material in the polymer film. Although the state of the polymer film molecules and the refractive index anisotropic material molecules in the retardation reinforcing region is not yet revealed sufficiently, especially in the case of producing by infiltrating a refractive index anisotropic material made of rod like molecules having the electric dipole moment in the longer axis direction thereof from the surface of the polymer film made of a linear polymer, it is assumed to be in the following state.

That is, the linear polymers in the polymer film are disposed substantially in the plane parallel to the front and rear surfaces of the polymer film on the average (however, the distribution of the direction thereof in the parallel planes is in disorder). Then, the rod like refractive index anisotropic material molecules infiltrated from the surface of the polymer film have the orientation forcibly aligned by the polymer film arrangement so as to be arranged in the plane parallel to the front and rear surfaced of the polymer film on the average (however, the distribution of the direction thereof in the parallel planes is in disorder).

Thereby, in the retardation reinforcing region, since the electric dipole moment vectors of the refractive index anisotropic material are aligned in the plane parallel to the front and rear surfaces of the polymer film on the average, the refractive index in the normal direction orthogonal to the plane parallel to the front and rear surfaces of the polymer film becomes relatively lower than the refractive index in the plane direction. Thereby, a negative C plate characteristic is provided.

By further orienting the retardation film in this state in for example a specific direction in the plane parallel to the front and rear surfaces of the polymer film, since the electric dipole moment vectors of the rod like refractive index anisotropic material are oriented in the specific direction on the average, the refractive index in the specific direction is further made higher. Thereby, a positive A plate characteristic is provided in addition to the negative C plate characteristic.

Furthermore, in the case the refractive index anisotropic material has a plurality of polymerizable functional groups per one molecule and they are polymerized and fixed, in the retardation reinforcing region, the molecular chains of the polymer film are enveloped by the three-dimensionally cross-linked molecules of the refractive index anisotropic material so as to be in a state with the molecular chains of the polymer film inserted in the mesh of the three-dimensionally cross-linked molecules of the refractive index anisotropic material. Furthermore, in the case the molecules of the polymer film and the molecules of the refractive index anisotropic material can be chemically bonded with each other, it comes into a composite polymer state with the molecules of the polymer film and the molecules of the refractive index anisotropic material cross-linked three-dimensionally.

According to the above-mentioned state, exudation of the refractive index anisotropic material can be prevented so as to provide a stable refractive index anisotropy.

In the first embodiment, it is characterized in that the retardation reinforcing region containing the refractive index anisotropic material is formed on one surface side of the polymer film as mentioned above. The concentration gradient of the refractive index anisotropic material in the retardation reinforcing region is generally made higher concentration on the surface side of the polymer film, and is made lower concentration toward the center side in the thickness direction of the polymer film. And the base material region, which contains no refractive index anisotropic material, is formed on the other surface side of the polymer film.

In this embodiment, since the retardation reinforcing region is formed on one surface side of the polymer film as mentioned above, the following advantages can be obtained.

That is, since the refractive index anisotropic material is not contained on the base material region side, the nature of the polymer film remains as it is. Since the base material region not containing the refractive index anisotropic material is provided, there are advantages such as, for example, when the adhesive property of the polymer film itself is good or the like, a polarizing film can easily be obtained by laminating a polarizing layer on the above-mentioned base material region side. Moreover, the strength of the retardation reinforcing region containing the refractive index anisotropic material may be deteriorated in some cases. However, since the base material region is provided, the strength as the retardation film can be maintained, and thus, it is advantageous.

The thickness of the retardation reinforcing region in the present invention is generally in a range of 0.5 μm to 8 μm, and it is particularly preferably in a range of 1 μm to 4 μm. When it is smaller than the above-mentioned range, a sufficient retardation value cannot be obtained. Furthermore, it is difficult to increase the thickness more than the above-mentioned range.

Whether or not, the concentration gradient of the refractive index anisotropic material is as this embodiment, can be judged by the composition analysis of the retardation reinforcing region and the base material region.

As the composition analyzing method, a method of measuring the concentration distribution of the material in the thickness direction by cutting a retardation film by the GSP (Gradient Shaving Preparation) so as to provide the cross section in the thickness direction, and carrying out the Time of Flight Secondary Ion Mass Spectrometry (TOF-SIMS), or the like can be presented.

The Time of Flight Secondary Ion Mass Spectrometry (TOF-SIMS) can be carried out, for example, by measuring the positive and/or negative secondary ions in the cross section in the retardation film thickness direction with TFS-2000 manufactured by Physical Electronics Corp. as the Time of Flight Secondary Ion Mass Spectrometer, $Ga^+$ as the primary ion species, 25 kV as the primary ion energy and 5 kV post acceleration. In this case, the thickness direction concentration distribution of the refractive index anisotropic material can be obtained by plotting the secondary ion intensity derived from the refractive index anisotropic material against the thickness direction. Similarly by plotting the secondary ion intensity derived from the base material film against the thickness direction, the relative concentration change of the refractive index anisotropic material and the base material film can be observed. As the secondary ion derived from the refractive index anisotropic material, for example, the total sum of the secondary ion observed relatively strongly at the surface or the part with the refractive index anisotropic material presumed to be filled by the analysis method such as the cross section TEM observation can be used. As the secondary ion derived from the base material film, for example, the total sum of the secondary ion observed relatively strongly at the surface or the part with the refractive index anisotropic material presumed not to be filled by the analysis method such as the cross section TEM observation can be used.

In the case of the first embodiment, it is preferable that the contact angles of the above-mentioned retardation film with respect to pure water are different between one surface and the other surface. With such configuration, in the case of providing a polarizing film by for example directly laminating a hydrophilic resin based polarizing layer having a PVA base material onto the retardation film, if the polarizing layer is laminated on the surface having a lower contact angle, a polarizing film can be obtained without inhibiting the adhesion even in the case a water based adhesive is used.

According to the present invention, the difference of the contact angles of one surface and the other surface of the retardation film with respect to pure water is preferably 2 degrees or more, more preferably 4 degrees or more and particularly preferably 5 degrees or more.

Although the retardation reinforcing region 2 is formed on the one surface side 3 of the polymer film 1 and the base material region 5 is formed on the opposite surface side 4 in the example of FIG. 1, the first embodiment includes also an embodiment with the refractive index anisotropic material contained by a high concentration on one surface side of the polymer film and the refractive index anisotropic material contained by a low concentration on the opposite surface side. Also in this case, there is an advantage that the low concentration side is close to the nature of the polymer film itself in terms of the surface adhesion property and the strength compared with the high concentration side. In the case of laminating another layer on the low concentration side surface, the concentration of the refractive index anisotropic material is preferably a low concentration within a range not to disturb the adhesion property of the polymer film itself, for example, a concentration to provide the difference of the contact angles between the high concentration surface and the low concentration surface of the retardation film with respect to pure water of 2 degrees or more, more preferably 4 degrees or more and particularly preferably 5 degrees or more.

(2) Second Embodiment

Figure 2:
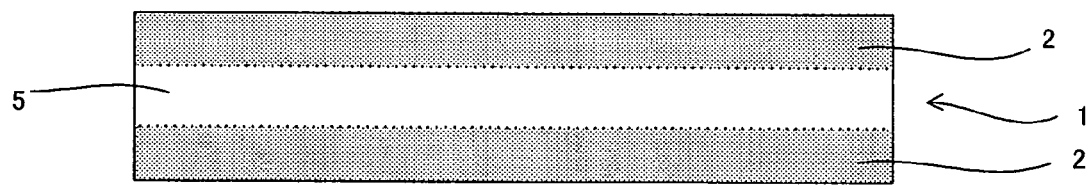
FIG. 2 is a schematic cross sectional view showing another example of the retardation film of the present invention.

The second embodiment of the present invention is an embodiment that the concentration gradient of the refractive index anisotropic material is higher concentration on the both surface sides of the polymer film, and becomes lower concentration toward the central part. The second embodiment is shown schematically in FIG. 2. As shown in FIG. 2, in this embodiment, a retardation reinforcing region 2 containing a refractive index anisotropic material is formed on both surface sides of a polymer film 1. And a base material region 5 is formed in the central part.

In this embodiment, the retardation reinforcing region containing the refractive index anisotropic material is formed on the both surface sides of the polymer film. The concentration gradient of the refractive index anisotropic material in the retardation reinforcing region has generally higher concentration on the surface side of the polymer film, and becomes lower concentration toward the center side in the thickness direction of the polymer film. And the base material region containing no refractive index anisotropic material is formed at the central part, in the thickness direction, of the polymer film.

Since the film thickness of the retardation reinforcing region in this case is same as that of the above-mentioned first embodiment, explanation is omitted here.

In this embodiment, since the retardation reinforcing region is formed on the both surface sides of the polymer film as mentioned above, the following advantages can be obtained.

That is, in this embodiment, since the retardation reinforcing region is provided on the both surface sides, the retardation value in the retardation reinforcing region is expected to be a double of that in the above-mentioned first embodiment. Therefore, it is advantageous in cases in which greater retardation value is required, such that the retardation value of the above-mentioned first embodiment is not sufficient, or the like.

Moreover, although the retardation reinforcing region containing the refractive index anisotropic material may have the strength as the retardation film lowered, since the base material region as a region containing no refractive index anisotropic material is provided in the central part, it is advantageous in that the strength as the retardation film can be maintained, or the like.

Although the retardation reinforcing region 2 containing the refractive index anisotropic material is formed on the both surface sides of the polymer film 1 and the base material region 5 is formed in the central part in the example of FIG. 2, the second embodiment includes also an embodiment with the refractive index anisotropic material contained by a high concentration on the both surface sides of the polymer film and the refractive index anisotropic material contained by a low concentration in the central part. Also in this case, there is an advantage that the low concentration region is close to the nature of the polymer film itself in terms of the surface adhesion property and the strength compared with the high concentration region.

Whether or not, the concentration gradient of the refractive index anisotropic material is as this embodiment, can be judged by the composition analysis of the retardation reinforcing region and the base material region by the same method as in the case of the above-mentioned first embodiment.

According to the present invention, in any of the above-mentioned embodiments, it is preferable that the concentration gradient of the material having refractive index anisotropy in a thickness direction of the polymer film varies continuously. In such a case, compared with the case that the concentration varies discontinuously at a certain thickness, since the stress concentration to a specific interface in the film can be eliminated, the peeling strength can be made higher so that the reliability such as the heat resistance and the water resistance (durability in term of the delamination with respect to repetition of the coldness and the heat in the use environment or contact with water), the alkaline resistance, and the reworking property, or the like can be improved.

The continuous change of the concentration gradient here denotes the case where the concentration change in the thickness direction is continuous in the case the concentration is plotted in the vertical axis and the thickness direction is plotted in the lateral axis as for example shown in FIGS. 3A to 3E.

Moreover, according to the present invention, it is preferable that a region in which the concentration gradient of the material having refractive index anisotropy is gentle and a region in which the concentration gradient of the material having refractive index anisotropy is steep are provided. In such a case, by concentrating a sufficient amount of the material having refractive index anisotropy in a high concentration region having a gentle concentration gradient, a sufficient retardation value can be ensured, and furthermore, by linking continuously the concentrations from the high concentration region to the low concentration region in the steep concentration gradient region, the stress concentration to a specific interface in the film can be prevented, and thus the reliability can be improved while providing a desired retardation.

Figure 3A:
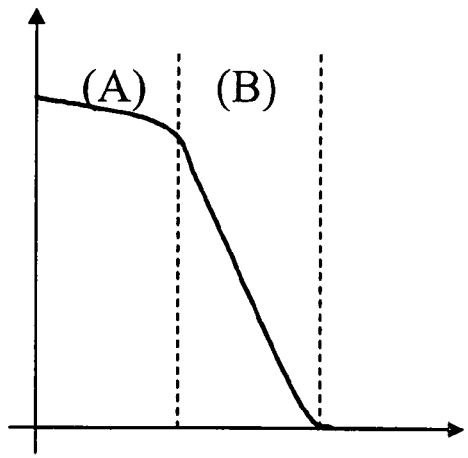
FIGS. 3A to 3E are graphs schematically showing the concentration gradient distributions.
Figure 3B:
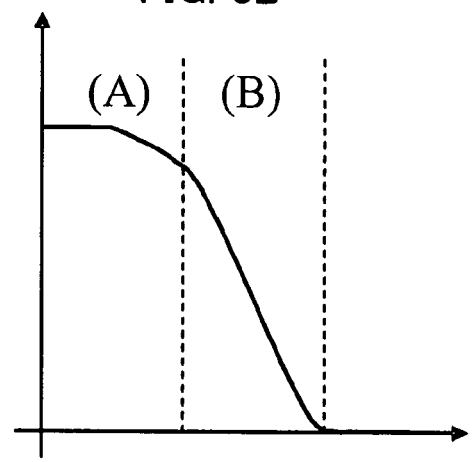
Figure 3C:
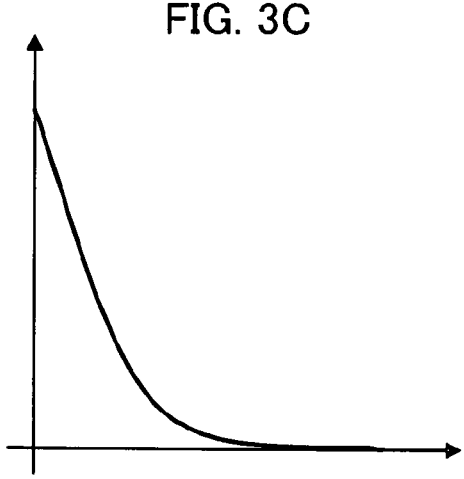
Figure 3D:
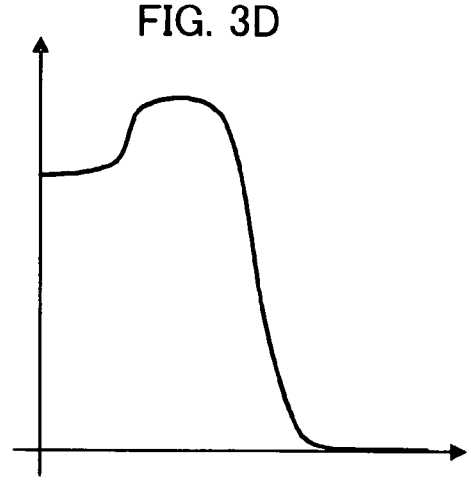
Figure 3E:
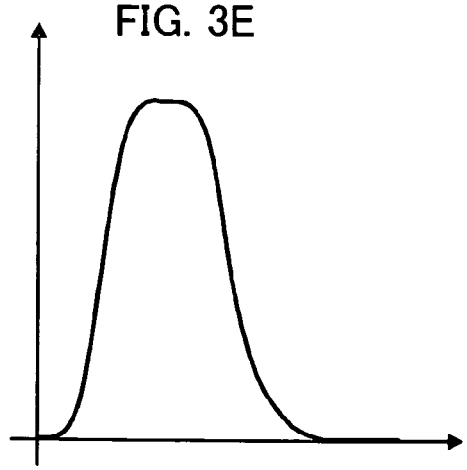

In the present invention, "gentle" or "steep" in the concentration gradient denotes the relative relationship in the concentration gradient in the thickness direction of the material having refractive index anisotropy. The region having a gentle concentration gradient and the region having a steep concentration gradient are relatively classified macroscopically as a region having the concentration gradient continuously in a small value and a region having the same continuously in a large value. The region having the gentle concentration gradient in this case includes a region having a constant concentration gradient. In the present invention, the region having a gentle concentration gradient includes the case having a relatively high concentration of the refractive index anisotropic material with the refractive index anisotropic material filled in the polymer film by a concentration close to the saturated state as shown in the region A of FIG. 3A and the region A of FIG. 3B, or the like. Moreover, in the present invention, the region having a steep concentration gradient includes the region of the transition from a region containing the refractive index anisotropic material in a relatively high concentration to the base material region containing no refractive index anisotropic material as shown in the region B of FIG. 3A and the region B of FIG. 3B, or the like. In the case a high retardation value is required, in general the concentration gradient as shown in FIG. 3A and FIG. 3B is preferable. However, in the case a high retardation value is not particularly required, as shown in FIG. 3C, an embodiment which a region having a steep concentration gradient transiting from a high concentration to a low concentration toward the central part formed in the vicinity of the polymer film surface with the refractive index anisotropic material filled in a high concentration, and a region having a gentle concentration gradient with the refractive index anisotropic material filled in a low concentration formed on the central part are provided continuously may be employed.

Figure 4:
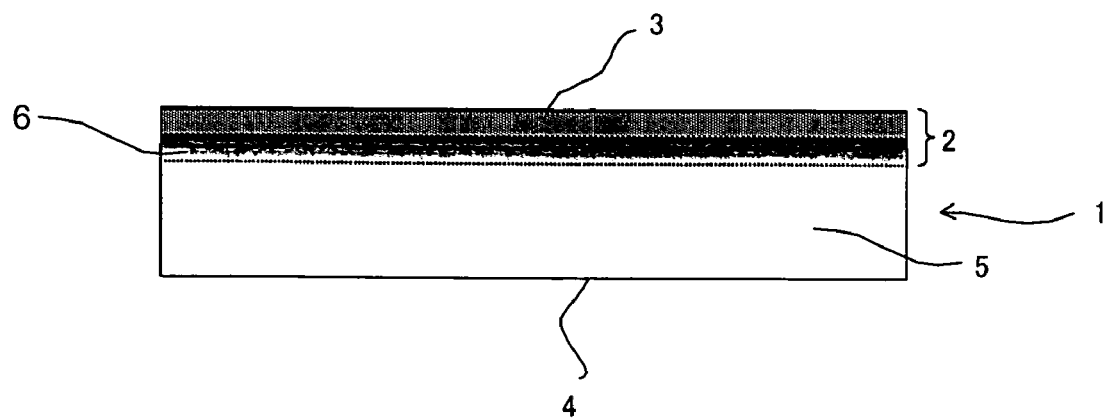
FIG. 4 is a schematic cross sectional view showing an example of a retardation film of the present invention.

In the case of a region in which the concentration gradient of the material having refractive index anisotropy is gentle and a region in which the concentration gradient of the material having refractive index anisotropy is steep are provided as mentioned above in the first embodiment, as shown schematically in FIG. 4, the case where the retardation reinforcing region 2 containing the refractive index anisotropic material is formed on one surface side 3 of the polymer film 1 and the base material region 5 is formed on the opposite surface side 4, and the intermediate region 6 having a steep concentration gradient transiting from the region containing the refractive index anisotropic material in a relatively high concentration and having a gentle concentration gradient to the base material region not containing the refractive index anisotropic material is formed in the boundary region with respect to the base material region 5 formed in the retardation reinforcing region 2, can be presented.

Figure 5:
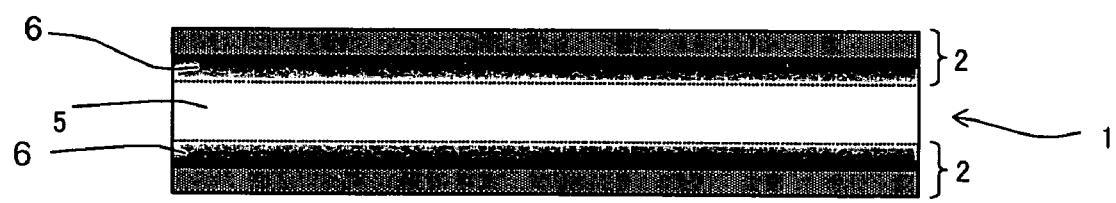
FIG. 5 is a schematic cross sectional view showing another example of a retardation film of the present invention.

In the case a region in which the concentration gradient of the material having refractive index anisotropy is gentle and a region in which the concentration gradient of the material having refractive index anisotropy is steep are provided as mentioned above in the second embodiment, as shown schematically in FIG. 5, the case where the retardation reinforcing region 2 containing the refractive index anisotropic material is formed on the both surface sides of the polymer film 1 and the base material region 5 is formed in the central part, and the intermediate region 6 having a steep concentration gradient transiting from the region containing the refractive index anisotropic material in a relatively high concentration and having a gentle concentration gradient to the base material region not containing the refractive index anisotropic material is formed in the boundary region with respect to the base material region 5 formed in the retardation reinforcing region 2, can be presented.

The continuous change of the concentration gradient of the material having refractive index anisotropy in the thickness direction of the polymer film and the presence of the above-mentioned region having a gentle concentration gradient of the material having refractive index anisotropy and the above-mentioned region having steep concentration gradient of the material having refractive index anisotropy can be judged by the concentration distribution analysis of the cross section in the retardation film thickness direction explained above with use of the Time of Flight Secondary Ion Mass Spectrometry (TOF-SIMS) or the like.

4. Biaxial Property

The biaxial property in the present invention denotes the optically biaxial property, which is $n_1 \neq n_2 \neq n_3$ with the premise that the principal refractive indices of the optically anisotropic medium are $n_1$, $n_2$, $n_3$ (the principal axes coordinate system of the index ellipsoid of the optically anisotropic medium are $X_1$, $X_2$, $X_3$). That is, those can be represented by $n_1 > n_2 > n_3$ in the case of representing the principal refractive indices of the optically anisotropic medium as $n_1$, $n_2$, $n_3$ in order of size.

Here, the principal coordinate system of the index ellipsoid ($X_1$, $X_2$, $X_3$) is a coordinate system in which the cross term of the quadratic form representing the index ellipsoid is zero, and the formula of the index ellipsoid is represented by $X_1^2/n_1^2 + X_2^2/n_2^2 + X_3^2/n_3^2 = 1$. The principal refractive indices $n_1$, $n_2$, $n_3$ are the refractive indices in the principal axes direction ($X_1$ axis direction, $X_2$ axis direction, $X_3$ axis direction) in the index ellipsoid. In other words, they correspond to the radiuses in the principal axes direction of the index ellipsoid respectively.

Therefore, the biaxial retardation film has refractive indices satisfying the condition of $n_1 > n_2 > n_3$, wherein the principal refractive indices of the index ellipsoid are $n_1$, $n_2$, $n_3$ in order of size when defining the index ellipsoid of the retardation film.

Figure 20:
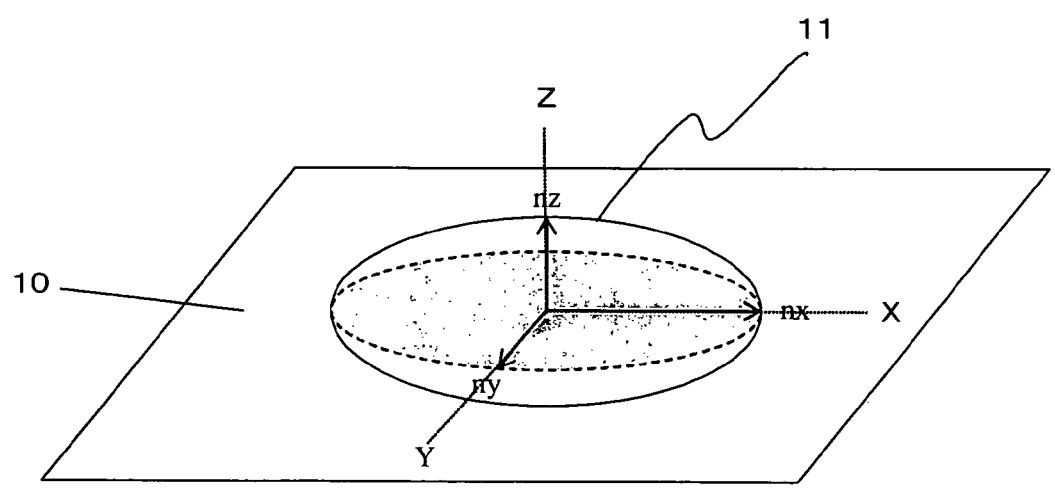
FIG. 20 is a diagram for explaining the case with the principal refractive index direction of the retardation film of the present invention coinciding with the in-plane directions and the film thickness direction of the retardation film.

Among them, in terms of the ordinary characteristics required and the production process, for example, as shown in FIG. 20, those having the principal refractive indices directions of the retardation film coinciding with the in-plane direction of the retardation film (direction parallel to the front and rear surfaces of the retardation film) and the film thickness direction (normal direction of the front and rear surfaces of the retardation film) are representative. In this case, the principal axes directions of the index ellipsoid of the retardation film ($X_1$ axis direction, $X_2$ axis direction, and the $X_3$ axis direction) provide a three dimensional coordinate system including the X axis (this is in the slow axis direction) and the Y axis (this is the fast axis direction) provided in the plane of the retardation film and the Z direction provided in the direction orthogonal to the retardation film plane. As the biaxial property in this case, nx>ny>nz, nz>nx>ny and nx>nz>ny can be presented, in which nx is the refractive index along the slow axis in the in-plane direction of the film, ny is the refractive index along the fast axis in the in-plane direction of the film, and nz is the refractive index along the thickness direction of the film. Here, the slow axis direction denotes the direction to have the largest refractive index in the film plane and the fast axis direction denotes the direction to have the smallest refractive index in the film plane.

In the present invention, in particular, nx>ny>nz is preferable, in which nx is the refractive index along the slow axis in the in-plane direction of the film, ny is the refractive index along the fast axis in the in-plane direction of the film, and nz is the refractive index along the thickness direction of the film. In the case such a biaxial property is provided, a retardation film having the optical characteristics of both a positive A plate and a negative C plate can be obtained. In this case, a positive A plate and a negative C plate need not be provided as the compensation layer so that it can be used preferably for a liquid crystal display having a liquid crystal layer of a VA mode, an OCB mode, or the like.

Here, the retardation layer is classified according to the optical axis direction and the size of the refractive index in the optical axis direction with respect to the refractive index in the direction orthogonal to the optical axis. One having the optical axis direction along the plane of the retardation layer is referred to as an A plate, one having the optical axis direction oriented in the normal direction perpendicular to the retardation layer is referred to as a C plate, and one having the optical axis direction inclined with respect to the normal direction is referred to as an O plate. Moreover, those having a refractive index in the optical axis direction larger than the refractive index in the direction orthogonal to the optical axis are referred to as a positive plate, and those having a refractive index in the optical axis direction smaller than the refractive index in the direction orthogonal to the optical axis are referred to as a negative plate. Thereby, they are classified into a positive A plate (nx>ny=nz), a negative A plate (nz=nx>ny), a positive C plate (nz>nx=ny), a negative C plate (nx=ny>nz), a positive O plate, and a negative O plate. Therefore, in the present invention, in the case of nx>ny>nz, characteristics having both the optical characteristics of a positive A plate and a negative C plate can be provided.

Figure 21:
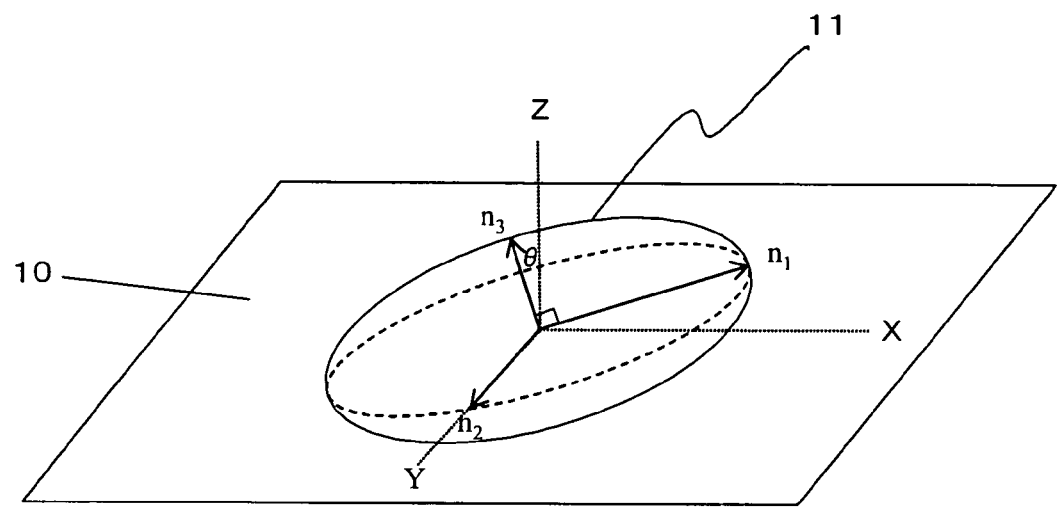
FIG. 21 is a is a diagram for explaining the case with the principal refractive index direction of the retardation film of the present invention inclined with respect to the in-plane directions and the film thickness direction of the retardation film.
Figure 22:
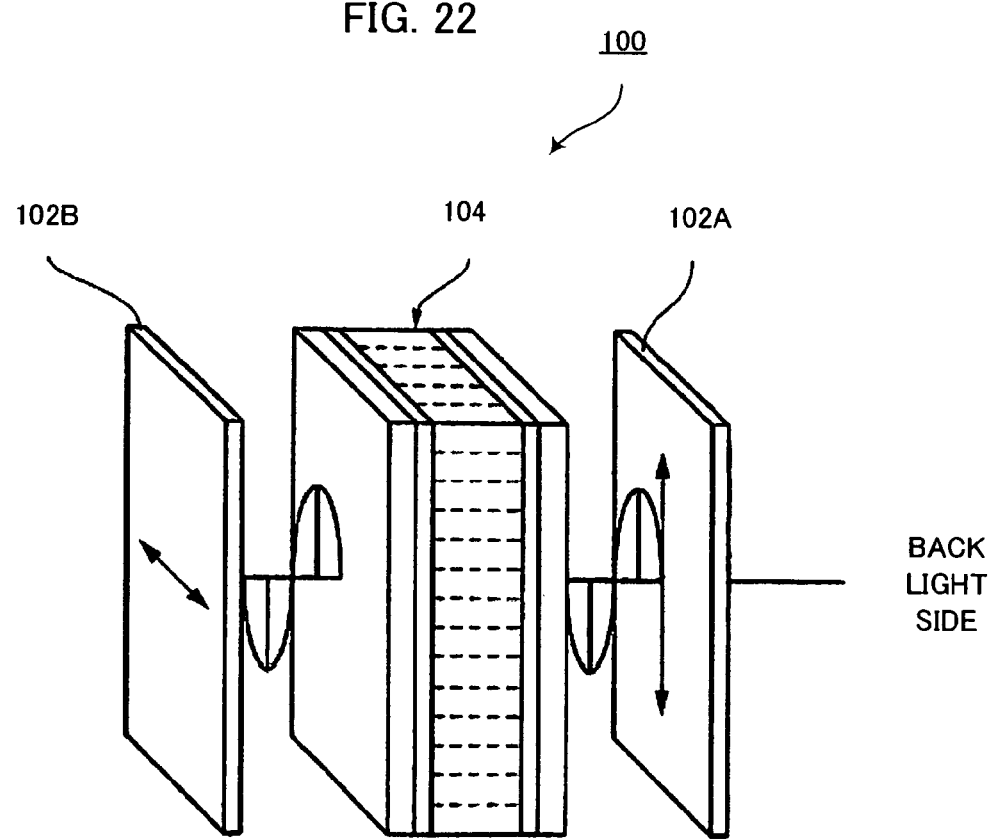
FIG. 22 is a schematic exploded perspective view showing the conventional liquid crystal display.

According to a retardation film of the present invention, for example, as shown in FIG. 21, the direction of the principal refractive indices of the retardation film may be inclined with respect to the in-plane direction and the thickness direction of the above-mentioned film. The inclination embodiment is not particularly limited. For example, an embodiment having the $n_2$ direction in the Y axis in the retardation film plane, the $n_1$ direction in the direction of rotating X axis in the retardation film plane by θ around the Y axis as the rotation axis, and the $n_3$ direction in the direction of rotating the Z axis provided in the direction orthogonal to the retardation film plane by θ around the Y axis as the rotation axis can be presented. Furthermore, for example, an embodiment having the $n_1$ direction in the X axis in the retardation film plane, the $n_2$ direction in the direction of rotating the Y axis in the retardation film plane by θ around the X axis as the rotation axis, and the $n_3$ direction in the direction of rotating the Z axis provided in the direction orthogonal to the retardation film plane by θ around the X axis as the rotation axis, or the like can be presented.

In the case the principal refractive indices direction of the retardation film is inclined with respect to the in-plane direction and the thickness direction of the film, the improvement of the visual angle can be obtained corresponding to various applications and design demands. Depending on the application, the purpose and the design specification, the principal refractive indices of the retardation film may be provided preferably in the direction inclined with respect to the in-plane direction and the thickness direction of the retardation film.

Also in the embodiment having the principal refractive indices direction of the retardation film inclined with respect to the in-plane direction and the thickness direction of the film, nx>ny>nz is preferable, in which nx is the refractive index along the slow axis in the in-plane direction of the film, ny is the refractive index along the fast axis in the in-plane direction of the film, and nz is the refractive index along the thickness direction of the film. In this case, a retardation film having the optical characteristics as a combination of those of the A plate and the negative C plate can be obtained. The above-mentioned refractive indices nx, ny, nz can be found by the three-dimensional refractive indices measurement at a 589 nm wavelength under the 23° C., 55% RH environment using for example an automatic birefringence measuring apparatus (for example, product name: KOBRA-21ADH, produced by Oji Scientific Instruments), either in the case of the embodiment having the principal refraction indices direction of the retardation film coinciding with the in-plane direction and the thickness direction of the film or in the case of the embodiment having the same inclined.

As it will be described in the column of "B. Method for producing the retardation film", it is preferable to obtain the biaxial property by orienting the polymer film at any point in time. The biaxial retardation film of the present invention can be obtained easily either by orienting the retardation film having the concentration gradient of the refractive index anisotropic material in the thickness direction of the polymer film or by coating a coating solution with the refractive index anisotropic material dissolved in a solvent onto the surface of a polymer film oriented preliminarily. For example, the biaxial property preferable in the present invention nx>ny>nz can be obtained by orienting in one direction in the in-plane direction of the polymer film or orienting in two directions orthogonal with each other in the in-plane direction of the polymer film by different magnifications.

4. Retardation Film

According to the present invention, since the thickness direction and in-plane direction retardation values to be obtained are adjusted by changing the retardation reinforcing region, and the stretching direction, the stretching ratio, or the like, the range of the thickness direction and in-plane direction retardation values to be obtained can be enlarged.

According to the present invention, the thickness direction retardation can be represented by $Rth[nm]=\{(nx+ny)/2-nz\}\times d$ (d: thickness), and the in-plane direction retardation is represented by $Re[nm]=(nx-ny)\times d$ (d: thickness), in which nx is a refractive index along a slow axis in plane of the film, ny is a refractive index along a fast axis in plane of the film, nz is a refractive index along a thickness direction of the film.

According to the retardation film of the present invention, it is preferable that the thickness direction retardation is 100 to 300 nm, and the in-plane direction retardation is 10 to 150 nm. In this case, for example the visual angle improving effect can be improved.

Furthermore, in the case of improving the visual angle characteristics of the VA liquid crystal and the polarizing plate, it is more preferable that the thickness direction retardation is 150 to 300 mm and the in-plane direction retardation is 40 to 100 nm.

The above-mentioned thickness direction and in-plane direction retardation values can be obtained by finding the refractive indices nx, ny, nz by the three-dimensional refractive indices measurement at a 589 nm wavelength under the 23° C., 55% RH environment using for example an automatic birefringence measuring apparatus (for example, product name: KOBRA-21ADH, produced by Oji Scientific Instruments).

Moreover, according to the present invention, since the thickness direction and in-plane direction retardation values to be obtained are adjusted using the both means for the retardation reinforcing region and the orientation, a desired retardation value can be achieved even with a smaller stretching ratio than that of adjusting the retardation value only by the orientation. In general, with a large stretching ratio, the retardation film is cloudy so that the retardation film has higher haze value and higher depolarization. That is, a problem is involved in that the polarization cannot be controlled due to the disturbance of the polarization state. However, according to the present invention, while improving the visual angle improving effect by obtaining a desired retardation value, the depolarization can be made extremely small.

That is, according to the retardation film of the present invention, with 10 to 150 nm in-plane direction retardation, a haze value of 1% or less measured in accordance with JIS-K7136 (established in 2000), or JIS-K7105 (established in 1981), and furthermore, with 40 to 100 nm in-plane direction retardation, a haze value of 0.8% or less measured in accordance with JIS-K7136 or JIS-K7105 can be achieved.

Moreover, according to the retardation films of the present invention, it is preferable that the retardation value, in the visible light range, of the retardation film on the shorter wavelength side is larger than that of the longer wavelength side. In general, the retardation value of a liquid crystal material used for a liquid crystal layer of a liquid crystal display, in the visible light range, on the shorter wavelength side is larger than that of the longer wavelength side. Therefore, in the case of using the retardation film of the present invention as, for example, an optical compensating plate, there is an advantage that the compensation can be carried out in the all wavelength range in the visible light range.

In order to make the retardation value in the visible light range of the retardation film larger on the shorter wavelength side than that of the longer wavelength side, it is preferable to select, for the polymer film and the refractive index anisotropic material, those having larger retardation value, in the visible light range, on the shorter wavelength side than that of the longer wavelength side. However, since the TAC film, used for the protecting film of the polarizing layer (such as a polyvinyl alcohol (PVA)) does not have the retardation value as mentioned above, it is preferable to select a refractive index anisotropic material having the above-mentioned retardation value.

On the other hand, according to the retardation films of the present invention, the retardation value, in the visible light range, of the retardation film on the longer wavelength side may be larger than that of the shorter wavelength side. In this case, when the retardation film of the present invention is used as, for example, a polarizing plate in a state laminated on a polarizing film, it is advantageous in that the excellent light leakage compensation can be provided, and thus it is preferable.

Moreover, the retardation film of the present invention containing at least the refractive index anisotropic material in the polymer film may contain another component as long as the effect of the present invention is not deteriorated. For example, a residual solvent, a photo polymerization initiating agent, a polymerization inhibiting agent, a leveling agent, a chiral agent, a silane coupling agent, or the like may be contained.

Moreover, the retardation film of the present invention may further have other layers laminated directly. For example, when the retardation value is insufficient as the retardation film, another retardation layer may further be laminated directly on the retardation film. Moreover, as it will be described later, other optical functional layers, for example, a polarizing layer may be laminated directly.

The retardation film of the present invention includes an embodiment in which the refractive index anisotropic material remains in a film state on the polymer film surface of the infiltration side in the case it is formed by coating the retardation reinforcing region forming coating solution prepared by dissolving or dispersing the refractive index anisotropic material in a solvent onto the surface of a polymer film for infiltrating the refractive index anisotropic material in the polymer film.

Moreover, according to the present invention, it is preferable that the retardation film capable being rolled into a cylindrical form having minimum diameter of 6 inches or less. It is preferable that the retardation film is formed into a long continuous film (also referred to as a web) and is rolled on a cylinder so as to be in a form of roll at the time of storage other than production, inspection and post process, and standby for a process, in order to improve the mass productivity and the production yield at the time of the production, the storage, the transportation and the post process. The diameter of the tube to be the core of the roll is in general 6 inches or less, an in some cases 3 inches. Therefore, in the case of providing the same capable of being rolled into a cylindrical form for the process advantage, it is preferable that the retardation film is capable of being rolled into a cylindrical form having a minimum diameter of 6 inches or less, more preferably a minimum diameter of 3 inches or less.

On the other hand, a material having refractive index anisotropy in general tends to be hard and brittle. Particularly in the case of polymerization for fixation, the tendency is remarkable. Therefore, according to the conventional retardation film having a configuration of laminating a retardation layer as another layer onto a polymer film base material, due to the hard and brittle retardation layer, a problem is involved in that the retardation layer is cracked or the retardation layer is peeled off from the base material at the time of rolling up into a diameter of 6 inches or less. For the cracking prevention, a protection layer needs to be further provided on the retardation layer. Moreover, although the problem can be solved by producing, storing, or the like the retardation film in a sheet like state of for example a 30 cm square sheet, the production efficiency and the mass productivity are deteriorated. On the other hand, since the retardation film obtained in the present invention has a retardation reinforcing region containing the refractive index anisotropic material formed in the polymer film, the retardation layer (retardation reinforcing region) is contained inside the polymer film, and a region not containing the retardation layer (or containing only little amount) is also provided. Therefore, without the need of providing a protection layer, or the like, cracking can hardly be generated by the stress concentration at the time of rolling into a cylindrical form so that a form of roll can be provided preferably.

Moreover, the retardation film of the present invention may be used not only by one sheet of a single layer but also by an embodiment of sticking and laminating two or more sheets if necessary. As a specific example of laminating two or more sheets, an embodiment of laminating two or more of the same retardation films with the principal refractive indices directions (optical anisotropy directions) aligned, an embodiment of laminating two or more of the same retardation films with the principal refractive indices directions differing with each other, an embodiment of laminating two or more of retardation films having different optical anisotropies with the principal refractive indices directions (optical anisotropy directions) aligned, an embodiment of laminating two or more of retardation films having different optical anisotropies with the principal refractive indices directions (optical anisotropy directions) differing with each other, or the like can be presented. In these cases, a large optical anisotropic value not to be realized by only one film can be realized, or a complicated optical anisotropy not to be realized by only one film can be realized.

Adhesion and lamination of the retardation films can be executed by for example adhering via an appropriate transparent adhesion layer.

5. Application

The retardation film of the present invention can be used for various applications as the optical functional film. Specifically, an optical compensating plate (for example, a visual angle compensating plate), an elliptical polarization plate, a brightness improving plate and the like can be presented.

In the present invention, the application as the optical compensating plate is particularly preferable. Specifically, it can be used for the application as a biaxial optical compensating plate having the functions of both a negative C plate and a positive A plate by using a TAC film as the polymer film, using a liquid crystalline compound, whose molecular structure is in a shape of a rod, as the refractive index anisotropic material and orienting the film at any point in time.

Moreover, the retardation film of the present invention can be used as various optical functional films used for a display device. For example, when the retardation film of the present invention is used as an optical compensating plate having the functions of a negative C plate and a positive A plate as mentioned above, it can be used preferably for a liquid crystal display having a VA mode, OCB mode or the like liquid crystal layer.

As heretofore explained, according to the retardation film of the present invention, the effects of the high reliability such as the heat resistance and the water resistance, the high alkaline resistance and the high reworking property without a problem of peeling off of the retardation layer from the base material generated in the case of forming a retardation layer, enlargement of the range of the thickness direction and in-plane direction retardation values to be achieved compared with the conventional biaxial retardation film, easiness of desirably controlling the thickness direction retardation and the in-plane direction retardation values independently, and obtainment of the optional thickness direction and in-plane direction retardation values easily even for a small amount can be achieved. Furthermore, since it has a preferable adhesion with respect to a hydrophilic film such as a polarizing layer and the excellent alkaline resistance, it is a preferable retardation film to be laminated directly on the polarizing layer.

B. Method for Producing Retardation Film

A method for producing a retardation film in the present invention comprises: a coating process of coating a retardation reinforcing region forming coating solution, in which a material having refractive index anisotropy is dissolved or dispersed in a solvent, on at least one surface side of a polymer film; an infiltration process of infiltrating the material having the refractive index anisotropy, in the retardation reinforcing region forming coating solution coated in the coating process, into the polymer film; a drying process of drying the solvent in the retardation reinforcing region forming coating solution coated in the coating process, and an orientation process for orienting the polymer film.

Furthermore, according to the present invention, it is preferable that a fixing process of fixing the refractive index anisotropic material infiltrated in the polymer film is provided after the above-mentioned drying process. By the fixation, exudation of the refractive index anisotropic material from the surface after the production can be prevented so that the retardation film stability can be improved. For example, in the case the refractive index anisotropic material has a polymerizable functional group, or the like, fixation can be carried out by the polymerization after infiltration of the refractive index anisotropic material into the polymer film so as to provide a polymer. In the present invention, "after the process" denotes a timing after the same without limitation, and includes not only "a timing immediately thereafter" but also "a timing after another process".

Figure 6A:
FIGS. 6A to 6D are process diagrams showing an example of a method for producing a retardation film according to the present invention.
Figure 6B:
Figure 6C:
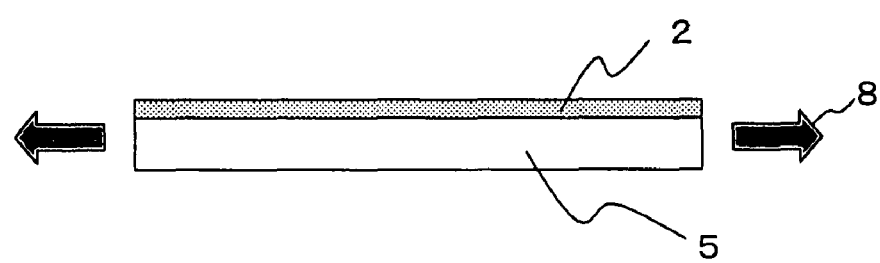
Figure 6D:
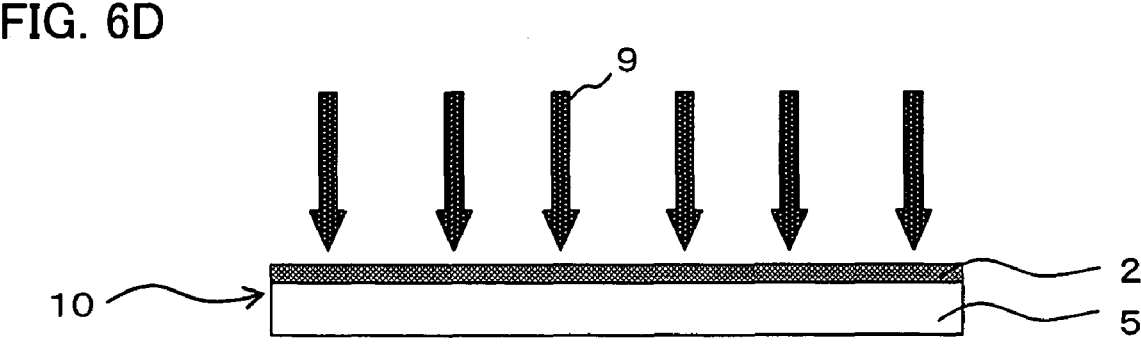

The method for producing a retardation film of the present invention will be explained specifically with referring to the drawings. FIGS. 6A to 6D are process diagrams showing an example of the method for producing a retardation film of the present invention. First, as shown in FIG. 6A, a coating process, of coating a retardation reinforcing region forming coating solution 7 onto a polymer film 1, is carried out. Then, as shown in FIG. 6B, an infiltration process, of infiltrating the refractive index anisotropic material in the retardation reinforcing region forming coating solution into the polymer film, and a drying process, of drying the solvent in retardation reinforcing region forming coating solution coated in the coating process, are carried out. Thereby, the refractive index anisotropic material in the retardation reinforcing region forming coating solution is infiltrated from the polymer film surface so that a retardation reinforcing region 2, containing the refractive index anisotropic material on the polymer film surface side, is formed. Accordingly, the retardation reinforcing region 2, which contains the refractive index anisotropic material, and the base material region 5, which contains no refractive index anisotropic material, are formed in the polymer film. Then, as shown in FIG. 6C, an orientation process of orienting 8 the polymer film is carried out. Then, finally, as shown in FIG. 6D, a retardation film 10 is formed by carrying out a fixing process of polymerizing the refractive index anisotropic material contained in the polymer film by the function of the photo polymerization initiator by irradiating an ultraviolet ray 9 from the retardation reinforcing region 2 side.

In the case of orienting the refractive index anisotropic material before the fixation as in the example mentioned above, the in-plane direction retardation of the retardation film can be enlarged in the orientation process.

Figure 7A:
FIGS. 7A to 7D are process diagrams showing another example of a method for producing a retardation film according to the present invention.
Figure 7B:
Figure 7C:
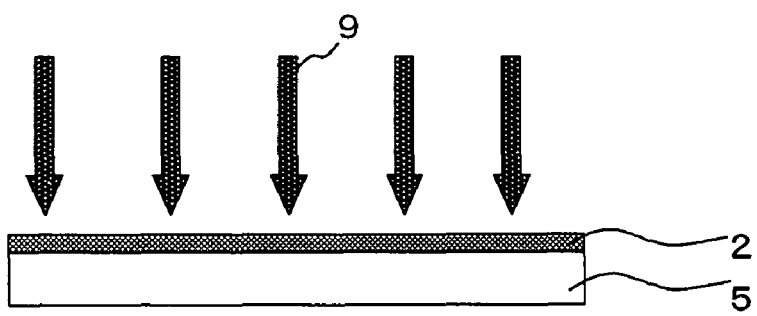
Figure 7D:
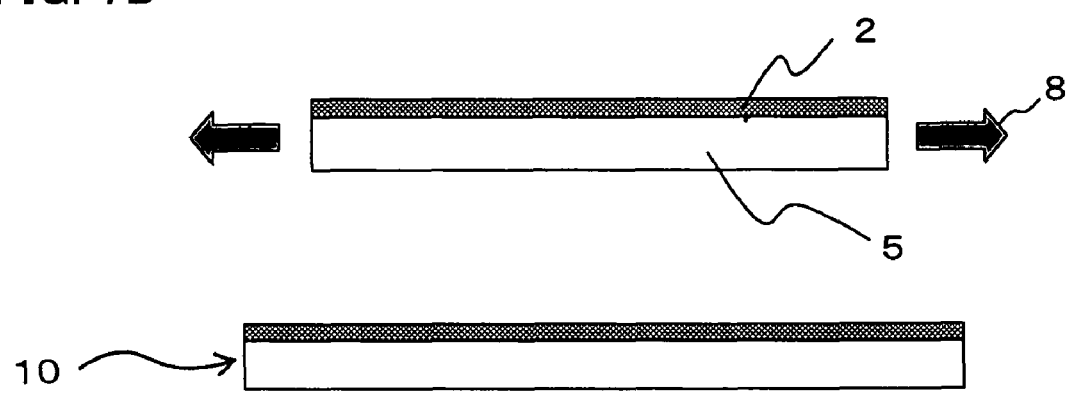

Moreover, FIGS. 7A to 7D are process diagrams showing another example of the method for producing a retardation film of the present invention. First, as shown in FIG. 7A, a coating process, of coating a retardation reinforcing region forming coating solution 7 onto a polymer film 1, is carried out. Then, as shown in FIG. 7B, an infiltration process, of infiltrating the refractive index anisotropic material in the retardation reinforcing region forming coating solution into the polymer film surface, is carried out. And then, a drying process, of drying the solvent in the retardation reinforcing region forming coating solution coated in the coating process, is carried out. Thereby, the refractive index anisotropic material in the retardation reinforcing region forming coating solution is infiltrated from the polymer film surface so that a retardation reinforcing region 2, containing the refractive index anisotropic material on the polymer film surface side, is formed. Accordingly, the retardation reinforcing region 2, which contains the refractive index anisotropic material, and the base material region 5, which contains no refractive index anisotropic material, are formed in the polymer film. Then, as shown in FIG. 7C, a fixing process of polymerizing the refractive index anisotropic material contained in the polymer film by the function of the photo polymerization initiator is carried out by irradiating an ultraviolet ray 9 from the retardation reinforcing region 2 side. Then, finally, as shown in FIG. 7D, a retardation film 10 is formed by carrying out an orientation process of orienting 8 the polymer film.

In the case of providing an orientation process of orienting the polymer film after the fixing process as in the example mentioned above, since the highly stable film with the refractive index anisotropic material fixed in the polymer film is oriented, there is an advantage that irregularity of the refractive index anisotropy realization degree due to irregularity of the orienting conditions can be made smaller so as to facilitate stabilization of the refractive index anisotropy.

Figure 8A:
FIGS. 8A to 8D are process diagrams showing another example of a method for producing a retardation film according to the present invention.
Figure 8B:
Figure 8C:
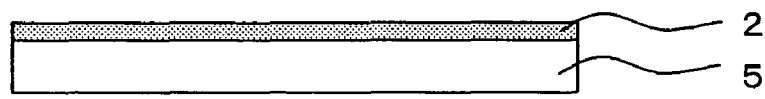
Figure 8D:
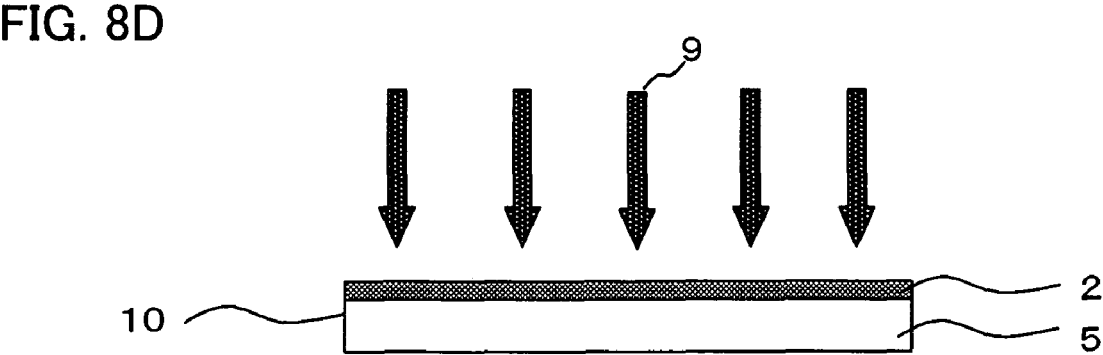

Moreover, FIGS. 8A to 8D are process diagrams showing another example of the method for producing a retardation film of the present invention. As shown in FIG. 8A, an orientation process of orienting 8 a polymer film 1 is carried out. Then, as shown in FIG. 8B, a coating process, of coating a retardation reinforcing region forming coating solution 7 onto the oriented polymer film 1, is carried out. Then, as shown in FIG. BC, an infiltration process, of infiltrating the refractive index anisotropic material in the retardation reinforcing region forming coating solution into the polymer film surface, is carried out. And then, a drying process, of drying the solvent in the retardation reinforcing region forming coating solution coated in the coating process, is carried out. Thereby, the refractive index anisotropic material in the retardation reinforcing region forming coating solution is infiltrated from the polymer film surface so that a retardation reinforcing region 2, containing the refractive index anisotropic material on the polymer film surface side, is formed. Accordingly, the retardation reinforcing region 2, which contains the refractive index anisotropic material, and the base material region 5, which contains no refractive index anisotropic material, are formed in the polymer film. Finally, as shown in FIG. 8D, a retardation film 10 is formed by carrying out a fixing process of polymerizing the refractive index anisotropic material contained in the polymer film by the function of the photo polymerization initiator by irradiating an ultraviolet ray 9 from the retardation reinforcing region 2 side.

In the case a preliminarily oriented polymer film is used as in the example mentioned above, there is an advantage that the orientation reversion can be reduced in the high temperature high humidity test to be carried out later by coating and infiltrating the refractive index anisotropic material after the orientation process, compared with those oriented after the coating process.

According to the method for producing a retardation film of the present invention as mentioned above, a biaxial retardation film can be formed easily by coating the above-mentioned retardation reinforcing region forming coating solution and orienting at any point in time. Furthermore, only by changing the coating amount, or the like of the retardation reinforcing region forming coating solution, the retardation value mainly in the thickness direction and furthermore in the in-plane direction of the retardation film to be obtained can be changed, and only by changing the stretching direction, the stretching ratio, or the like, the retardation value mainly in the in-plane direction and furthermore in the thickness direction of the retardation film to be obtained can be changed. Therefore, according to the present invention, compared with the conventional biaxial retardation films, the range of the thickness direction and in-plane direction retardation values can be enlarged, and there is an advantage that a biaxial retardation film having optional thickness direction and in-plane direction retardation values can be obtained easily even for a small amount.

Each process may be carried out two or more times. For example, first a coating process, of coating a first retardation reinforcing region forming coating solution on a polymer film is carried out. Then, an infiltration process, of infiltrating a first refractive index anisotropic material in the first retardation reinforcing region forming coating solution into the polymer film, and a drying process, of drying the solvent in the first retardation reinforcing region forming coating solution, are carried out. Then, a retardation film may be formed by further carrying out a coating process, of coating a second retardation reinforcing region forming coating solution onto the surface on the side with the first retardation reinforcing region forming coating solution coated, and subsequently, an infiltration process, of infiltrating a second refractive index anisotropic material in the second retardation reinforcing region forming coating solution into the polymer film, and a drying process, of drying the solvent in the second retardation reinforcing region forming coating solution, a fixing process from the side with the second retardation reinforcing region forming coating solution coated, and furthermore, an orientation process. In this case, by using for example a rod like liquid crystalline molecule having no polymerizable functional group to be easily infiltrated into the polymer film is used as the first refractive index anisotropic material and a rod like liquid crystalline molecule having a polymerizable functional group is used as the second refractive index anisotropic material, a region containing a rod like liquid crystalline molecule having no polymerizable functional group capable of reinforcing the retardation and a region containing a rod like liquid crystalline molecule having the polymerizable functional group on the surface side are formed at the same time so that the effect of stabilizing can be obtained by the polymerization by the fixing process of the polymer film surface while having the further reinforced retardation. By using a rod like liquid crystalline molecule having less polymerizable functional groups as the first refractive index anisotropic material and a rod like liquid crystalline molecule having more polymerizable functional groups as the second refractive index anisotropic material, the same effect can be obtained.

Moreover, a process of further coating a coating solution prepared by dissolving or dispersing a material having a polymerizable functional group, other than the refractive index anisotropic material, in a solvent, a process of drying the coating solution, and furthermore a process of polymerizing the polymerizable functional group may be provided after the above-mentioned coating process of coating the retardation reinforcing region forming coating solution, the above-mentioned infiltrating process and the above-mentioned drying process of the present invention. In this case, according to the fixation by the polymerization of the material having the polymerizable functional group present on the surface side of the polymer film, exudation of the refractive index anisotropic material can be prevented for example even in the case the refractive index anisotropic material contained in the retardation reinforcing region forming coating solution does not have the polymerizable functional group, and thus endurance and stability can be provided to the film.

Furthermore, it is preferable to provide a heating process after the orientation in terms of preventing the orientation reversion. An oriented polymer film during the retardation film producing process or before the producing process, tends to be shrunk (orientation reversion) due to the heat applied at the time of the post process such as the lamination onto the polarizing layer. In order to prevent the same, it is preferable to release or alleviate the residual stress capable of shrinking the polymer film by the heating process (annealing) at any point in time after the orienting operation. The heating process temperature condition is preferably a temperature from the glass transition temperature of the polymer film to the fusing temperature (or the melting point) in general.

Hereinafter, the method for producing a retardation film of the present invention will be explained by each step.

1. Coating Process

The coating process in the present invention is a process of coating a retardation reinforcing region forming coating solution, in which a refractive index anisotropic material is dissolved or dispersed in a solvent, on at least one surface side of a polymer film.

In the present invention, the retardation value of the obtained retardation film can be changed by the coating amount of the retardation reinforcing region forming coating solution in the coating process.

The retardation reinforcing region forming coating solution used in the present invention contains at least a solvent and a refractive index anisotropic material dissolved or dispersed in the above-mentioned solvent. According to a needed, other additives may be added. As such additives, specifically, when the used refractive index anisotropic material is a photo-curing type, a photo-polymerization initiator or the like can be presented. Additionally, a polymerization inhibitor, a leveling agent, a chiral agent, a silane coupling agent or the like can be presented.

Since the refractive index anisotropic material used for the retardation reinforcing region forming coating solution is same as those described in the above-mentioned column of "A. Retardation film", explanation is omitted here. When the refractive index anisotropic material has a polymerizable functional group and the below-mentioned fixing process (process of polymerizing the refractive index anisotropic material) is carried out in the producing process for the retardation film, since the refractive index anisotropic material contained in the retardation film is polymerized by a predetermined polymerization degree, strictly speaking, it is different from that used for the retardation reinforcing region forming coating solution.

Moreover, the solvent used for the above-mentioned retardation reinforcing region forming coating solution is not particularly limited as long as it is a solvent capable of sufficiently swelling the polymer film and capable of dissolving or dispersing the refractive index anisotropic material. Specifically, when the polymer film is TAC and the refractive index anisotropic material is the nematic liquid crystal having the acrylate on its end, a cyclohexanone can be used preferably.

Although the concentration of the refractive index anisotropic material in the solvent, in the retardation reinforcing region forming coating solution of the present invention, is not particularly limited, it is generally in a range of 5% by mass to 40% by mass, and particularly preferably in a range of 15% by mass to 30% by mass.

Moreover, although the coating amount onto the polymer film differs depending on the retardation value required for the obtained retardation film, it is preferable that the coating amount of the refractive index anisotropic material after the drying operation is in a range of 0.8 $g/m^2$ to 6 $g/m^2$, and particularly preferably in a range of 1.6 $g/m^2$ to 5 $g/m^2$.

The coating method in this process is not particularly limited as long as it is a method capable of coating the retardation reinforcing region forming coating solution evenly onto the polymer film surface, and a method such as bar coating, blade coating, spin coating, die coating, slit reverse, roll coating, dip coating, ink jet method, micro gravure method and the like can be used. In the present invention, it is particularly preferable to use blade coating, die coating, slit reverse and roll coating.

2. Infiltration Process and Drying Process

In the present invention, after the above-mentioned coating process, an infiltration process of infiltrating the refractive index anisotropic material, contained in the retardation reinforcing region forming coating solution coated in the coating process, into the polymer film; and a drying process of drying the solvent contained in the retardation reinforcing region forming coating solution coated in the coating process, are carried out.

The infiltration process, which is a process of leaving the polymer film after coating so that the refractive index anisotropic material is sufficiently infiltrated and taken into the polymer film, may be carried out simultaneously with the drying process depending on the kind of the solvent to be used or the like.

In the infiltration process, it is preferable that 90% by mass or more, preferably 95% by mass or more, particularly preferably 100% by mass of the refractive index anisotropic material in the above-mentioned retardation reinforcing region forming coating solution is infiltrated and taken into the polymer film. In the case a large amount of the refractive index anisotropic material remains on the polymer film surface without infiltrating into the polymer film, the surface is cloudy so that the light transmittance of the film may be lowered.

Therefore, it is preferable that the polymer film after the infiltration and drying processes have the haze value measured in accordance with JIS-K7136 of the surface on the infiltration side of 10% or less, more preferably 2% or less, and particularly preferably 1% or less.

In the above-mentioned drying process, which is a process of drying the solvent in the retardation reinforcing region forming coating solution, the temperature and the time may differ drastically depending on the kind of the solvent to be used and whether or not it is carried out simultaneously with the infiltration process. For example, when a cyclohexanone is used as the solvent and it is carried out simultaneously with the infiltration process, the drying process is carried out at a temperature generally in a range of the room temperature to 120° C., preferably in a range of 70° C. to 100° C., and for the time of about 30 seconds to 10 minutes, preferably about 1 minute to 5 minutes.

3. Orientation Process

In the present invention, an orientation process of orienting the polymer film is carried out at any point in time. In the present invention, according to the stretching or drawing direction or the stretching or draw ratio of the polymer film in the orientation process, the retardation value of the retardation film to be obtained can be changed.

The orientation process in the present invention may be a process of preparing an oriented polymer film.

In the present invention, in order to provide the biaxial property, either a uniaxial stretching process or a biaxial stretching process may be carried out depending on the polymer film to be used. Moreover, for the biaxial stretching process, an unbalance biaxial stretching process may be executed. According to the unbalance biaxial stretching, a polymer film is stretched by a certain magnification in a direction and it is stretched by a magnification larger than that in the direction perpendicular thereto. The two direction stretching process may be carried out at the same time.

For example, in the case of using an unstretched TAC film as the polymer film, since it inherently has a uniaxial property to function as a negative C plate, a biaxial property can be obtained by further executing the uniaxial stretching process in the in-plane direction of the film. The biaxial property may be obtained also by executing the biaxial stretching process in the in-plane direction in the case of using an unstretched TAC film as the polymer film.

The orientation process is not particularly limited. For example, it can be carried out by an optional stretching method such as the roll stretching method, the long spacing stretching method, the tenter stretching method and the tubular stretching method. At the orientation process, it is preferable to heat the polymer film, for example, to the glass transition temperature of the polymer film or higher and the fusing temperature (or the melting point) or lower.

The stretching ratio of the orientation process can be determined optionally according to the retardation value to be obtained, and thus it is not particularly limited. In terms of having the retardation values in each point in the film in-plane direction evenly, it is preferably in a range of 1.03 to 2 times, and it is further preferably in a range of 1.1 to 1.8 times. The thickness of the film after the orientation is not particularly limited, but it is in general 10 to 200 μm, and preferably 10 to 100 μm.

Moreover, the stretching direction is not particularly limited. For example, in the case of forming a polarizing film by directly laminating the retardation film of the present invention and a polarizing layer as described later, depending on the display mode to use the polarizing film, it may be preferable to dispose the slow axis direction in the retardation film plane and the polarizing axis direction of the polarizing layer perpendicularly. In this case, it is preferable to provide an orientation process in a direction such that the slow axis direction in the retardation film plane is perpendicular to the polarizing axis direction of the polarizing layer to be laminated in the orientation process of the present invention. Accordingly, a long continuous retardation film and a long continuous polarizing layer can be laminated directly so that it is highly advantageous in terms of the process compared with the case of laminating after cutting out and rotating by 90 degrees, or the like.

In general, the polarizing axis of the polarizing layer is in the direction parallel to the stretching direction of the polymer film comprising the polarizing layer. Since the orientation process can be executed easily in the longitudinal direction of the long continuous polarizing layer, the long continuous polarizing layer in general has the polarizing axis in the direction parallel to the longitudinal direction. In this case, it is preferable to provide a process of stretching the long continuous retardation film to be laminated directly in the width direction of the long continuous retardation film, such that the slow axis direction in the plane is in the width direction of the long continuous film.

4. Fixing Process

Furthermore, when the refractive index anisotropic material used has a polymerizable functional group, a fixing process is carried out for polymerizing the refractive index anisotropic material so as to be a polymer. By carrying out the fixing process as mentioned above, exudation of the refractive index anisotropic material, once taken into the polymer film, can be prevented so that the stability of the obtained retardation film can be improved.

For the fixing process in the present invention, various methods are used depending on the refractive index anisotropic material to be used. For example, when the refractive index anisotropic material is a cross-linking compound, a photo-polymerization initiator is contained and an ultraviolet ray or an electron beam is irradiated, and when it is a thermosetting compound, it is heated.

C. Optical Functional Group

Next, an optical functional group of the present invention will be explained. The optical functional group of the present invention is formed by directly laminating an optical functional layer other than the retardation film, onto the retardation film explained in the above-mentioned column of the "A. Retardation film".

The optical functional group in the present invention is not particularly limited as long as the desired optical functions can be realized totally in cooperation with the retardation film of the present invention in the various applications of using the retardation film of the present invention. As the optical functional layer in the present invention, for example, a reflection preventing layer, an ultraviolet ray absorbing layer, an infrared ray absorbing layer, or the like can be presented.

Therefore, the optical functional group of the present invention is a film having the functions of the above-mentioned optical functional layer in addition to the functions of the retardation film explained in the above-mentioned column of the "A. Retardation film". Since the optical functional group of the present invention has both the functions of the retardation film of the present invention such as the optical compensation and the other functions such as the reflection prevention by itself, it is advantageous in that films having each function need not be provided independently.

The reflection preventing layer is not particularly limited, and for example, one having a low refractive index layer made of a material having a lower refractive index than that of the transparent base material formed on a transparent base material film, one having a high refractive index layer made of a material having a higher refractive index than that of the transparent base material and a low refractive index layer made of a material having a lower refractive index than that of the transparent base material formed in this order alternately by each one or more layers on a transparent base material film, or the like can be presented. The high refractive index layer and the low refractive index layer can be formed by vacuum deposition, coating, or the like such that the optical thickness represented by the multiple of the geometrical thickness of the layer and the refractive index is ¼ of the wavelength of the light to prevent the reflection. As the constituent material for the high refractive index layer, a titanium oxide, a zinc sulfide, or the like, and as the constituent material for the low refractive index layer, a magnesium fluoride, a cryolite, or the like can be used.

Moreover, the ultraviolet ray absorbing layer is not particularly limited, and for example, a film formed by adding an ultraviolet ray absorbing agent made from a benzotriazole based compound, a benzophenone based compound, a salicilate based compound, or the like in a film of a polyester resin, an acrylic resin, or the like can be used.

Moreover, the infrared ray absorbing layer is not particularly limited, and for example, one formed by coating, or the like an infrared ray absorbing layer on a film base material made of a polyester resin, or the like can be presented. As the infrared ray absorbing layer, for example, one formed by adding an infrared ray absorbing agent made from a diimmonium based compound, a phthalocyanine based compound, or the like in a binder resin made of an acrylic resin, a polyester resin, or the like can be used.

According to the present invention, the above-mentioned first embodiment of the retardation film, that is, the retardation film of the embodiment that the concentration gradient of the refractive index anisotropic material is high concentration on one surface side of the polymer film, and becomes low concentration toward the other surface side, and the other surface side is the base material region can be used preferable.

Although it depends also on the kind of the polymer film used for the retardation film, the surface on the side without the presence of the refractive index anisotropic material has a preferable adhesion property with respect to the optical functional layer in many cases.

D. Polarizing Film

Next, the polarizing film of the present invention will be explained. The polarizing film of the present invention is formed by directly laminating a polarizing layer onto the retardation film explained in the above-mentioned column of the "A. Retardation film" by a polyvinyl alcohol (PVA) based adhesive, or the like.

The polarizing film in general has a polarizing layer and protection layers formed on its both surfaces. However, in the present invention, by providing the above-mentioned retardation film for the protection layer on one side thereof, a polarizing film having for example an optical compensation function can be provided.

As the polarizing layer, although it is not particularly limited, for example, an iodine based polarizing layer, a dye based polarizing layer using a dichroic dye, a polyene based polarizing layer, or the like can be used. The iodine based polarizing layer and the dye based polarizing layer are manufactured using in general a polyvinyl alcohol.

According to the present invention, the above-mentioned first embodiment of the retardation film, that is, the retardation film of the embodiment that the concentration gradient of the refractive index anisotropic material is high concentration on one surface side of the polymer film, and becomes low concentration toward the other surface side can be used preferable. The polarizing layer is in general made of a polyvinyl alcohol (PVA) in many cases. In this case, although it depends also on the kind of the polymer film used for the retardation film, the surface on the side without the presence of the refractive index anisotropic material has a preferable adhesion property.

E. Display Device

Finally, the display device of the present invention will be explained. As the display device in the present invention, for example, a liquid crystal display, an organic EL display device, or the like can be presented.

A first embodiment of the display device of the present invention has the retardation film of the present invention as mentioned above disposed in the light path. The display device of the present invention has a high reliability and the excellent display quality, since the retardation film having an appropriate retardation without the problem of peeling off, or the like is disposed.

Figure 9:
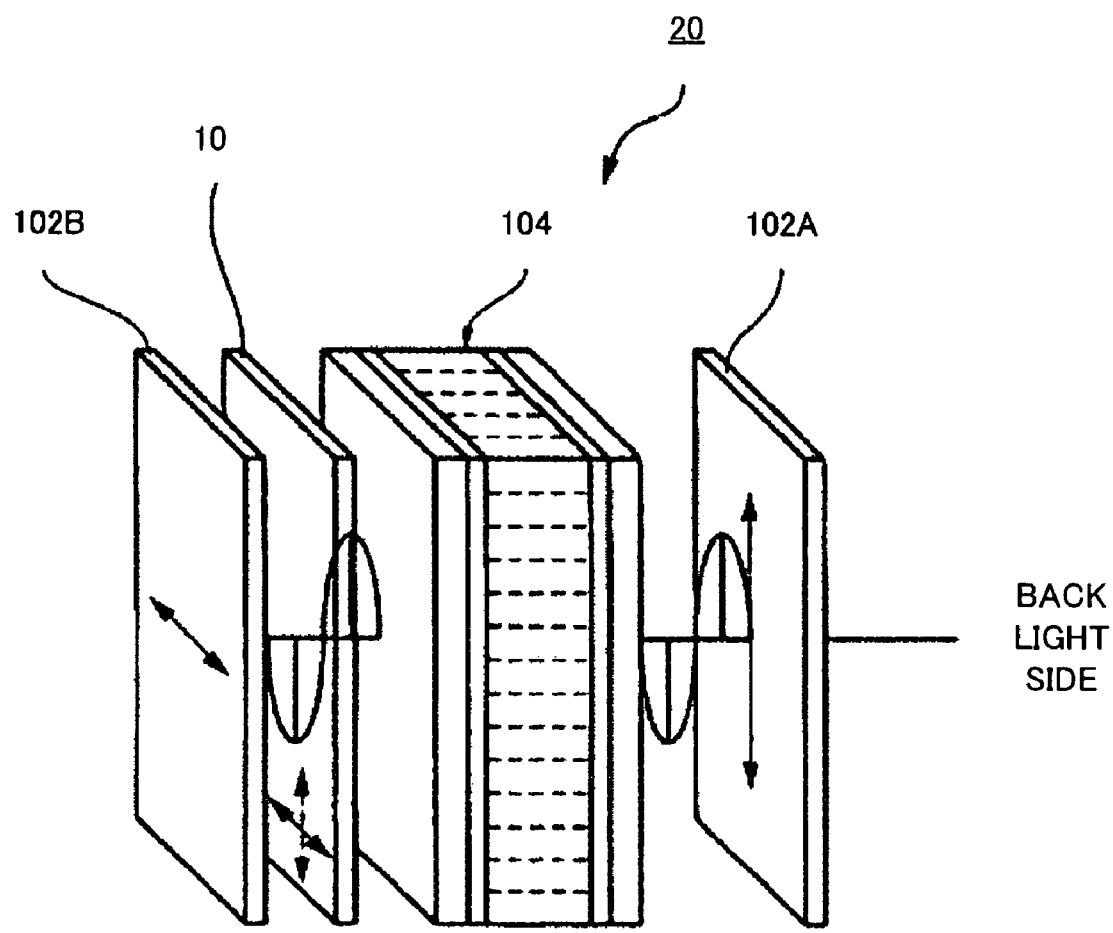
FIG. 9 is a schematic exploded perspective view showing an example of a liquid crystal display comprising a retardation film of the present invention.

FIG. 9 is a perspective view showing an example of a liquid crystal display as one of the display device of the present invention. As shown in FIG. 9, the liquid crystal display 20 of the present invention comprises an incident side polarizing plate 102A, an output side polarizing plate 102B, and a liquid crystal cell 104. The polarizing plates 102A, 102B are provided so as to selectively transmit only the linear polarization having an oscillation plane in a predetermined oscillation direction, and disposed in a cross nicol state with the oscillating directions perpendicular with each other. Moreover, the liquid crystal cell 104 including a large number of cells corresponding to the pixels, is disposed between the polarizing plates 102A and 102B.

Here, according to the liquid crystal display 20, the liquid crystal cell 104 employs a VA (vertical alignment) system with nematic liquid crystals having a negative dielectric anisotropy sealed so that a linear polarization transmitted through the incident side polarizing plate 102A is transmitted without the phase shift at the time of being transmitted the non driven state cell part of the liquid crystal cell 104 so as to be blocked by the output side polarizing plate 102B. On the other hand, at the time of being transmitted the driven state cell part of the liquid crystal cell 104, the linear polarization has the phase shift so that a light beam of the amount corresponding to the phase shift amount is transmitted and output from the output side polarizing plate 102B. Thereby, by optionally controlling the driving voltage of the liquid crystal cell 104 for each cell, a desired image can be displayed on the output side polarizing plate 102B side.

In the liquid crystal display 20 having such a configuration, the retardation film 10 according to the present invention as mentioned above is disposed in the light path between the liquid crystal cell 104 and the output side polarizing plate 102B (the polarizing plate for selectively transmitting a light beam in a predetermined polarizing state output from the liquid crystal cell 104) so that the polarizing state of the light beam output in a direction inclined with respect to the normal of the liquid crystal cell 104 among the light beam in the predetermined polarizing state output from the liquid crystal cell 104 can be compensated by the retardation film 10. Furthermore, according to the retardation film 10 of the present invention, the light leakage from the polarizing plate 102B can be prevented as well.

As mentioned above, according to the liquid crystal display 20 of the above-mentioned configuration, since the highly reliable retardation film 10 of the present invention as mentioned above is disposed between the liquid crystal cell 104 and the output side polarizing plate 102B of the liquid crystal display 20 so that the polarizing state of the light beam output in a direction inclined with respect to the normal of the liquid crystal cell 104 among the light beam in the predetermined polarizing state output from the liquid crystal cell 104 can be compensated, the problem of the visual angle dependency in the liquid crystal display 20 can be improved effectively, and furthermore, since the light leakage from the polarizing plate can be prevented, the problem of the visual angle dependency in the polarizing plate can also be improved, and thus the excellent display quality and the high reliability can be achieved.

Although the liquid crystal display 20 shown in FIG. 9 is of a transmission type to have the light beam transmitted from one side of the thickness direction to the other side, the embodiments of the display device according to the present invention are not limited thereto, and the retardation film 10 according to the present invention as mentioned above can be assembled and used in the same manner in a reflection type liquid crystal display. Furthermore, it can be assembled and used in the same manner in the light path of another display device as mentioned above.

Moreover, although the retardation film 10 according to the present invention as mentioned above is disposed between the liquid crystal cell 104 and the output side polarizing plate 102B in the liquid crystal display 20 shown in FIG. 9, depending on the optical compensation embodiment, the retardation film 10 may be disposed between the liquid crystal cell 104 and the incident side polarizing plate 102A. Moreover, the retardation film 10 may be disposed on the both sides of the liquid crystal cell 104 (between the liquid crystal cell 104 and the incident side polarizing plate 102A, and between the liquid crystal cell 104 and the output side polarizing plate 102B). The number of the retardation film to be disposed between the liquid crystal cell 104 and the incident side polarizing plate 102A, or between the liquid crystal cell 104 and the output side polarizing plate 102B is not limited to one, and a plurality of them may be disposed.

Moreover, a second embodiment of the display device of the present invention has the optical functional film according to the present invention as mentioned above disposed in the light path. Accordingly, a display device having a high reliability and the excellent display quality can be obtained without the need of additionally providing an optical functional plate having a function other than the above-mentioned retardation film.

Figure 10:
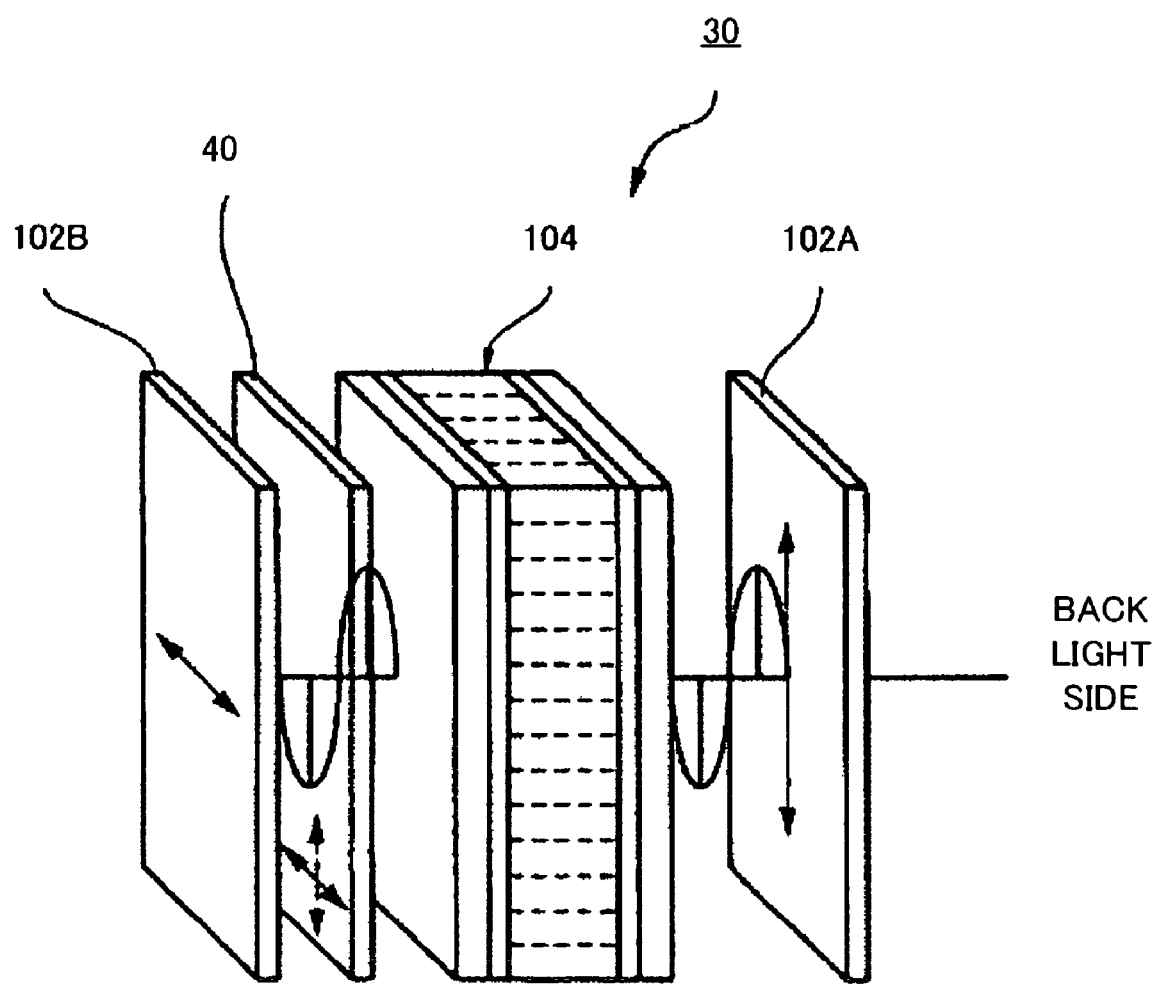
FIG. 10 is a schematic exploded perspective view showing an example of a liquid crystal display comprising an optical functional film of the present invention.

FIG. 10 is a perspective view showing an example of a liquid crystal display as one of the display device of the present invention. As shown in FIG. 10, the liquid crystal display 30 of the present invention comprises an incident side polarizing plate 102A, an output side polarizing plate 102B, and a liquid crystal cell 104. As the polarizing plates 102A, 102B and the liquid crystal cell 104, those same as the ones in FIG. 9 can be arranged the same as in FIG. 9.

In the liquid crystal display 30 having such a configuration, the optical functional film 40 according to the present invention as mentioned above is disposed in the light path between the liquid crystal cell 104 and the output side polarizing plate 102B. The function of the optical functional film is not particularly limited, and in the case the ultraviolet ray absorbing function is provided in addition to the optical compensation function, the polarizing state of the light beam output in a direction inclined with respect to the normal of the liquid crystal cell 104 among the light beam in the predetermined polarizing state output from the liquid crystal cell 104 can be compensated by the optical functional film 40, the light leakage can be prevented, and the ultraviolet ray derived from the sun beam, or the like incident on the liquid crystal display from the outside can be absorbed so as to improve the light resistance of the liquid crystal display.

As mentioned above, according to the liquid crystal display 30 of the above-mentioned configuration, since the highly reliable optical functional film 40 of the present invention as mentioned above is disposed between the liquid crystal cell 104 and the output side polarizing plate 102B of the liquid crystal display 30 so that the polarizing state of the light beam output in a direction inclined with respect to the normal of the liquid crystal cell 104 among the light beam in the predetermined polarizing state output from the liquid crystal cell 104 can be compensated, the problem of the visual angle dependency in the liquid crystal display 30 can be improved effectively, and, since the light leakage from the polarizing plate can be prevented, the problem of the visual angle dependency in the polarizing plate can also be improved, the light resistance can be improved by for example the ultraviolet ray absorbing function, and the excellent display quality can be achieved.

The embodiments of the display device according to the present invention are not limited thereto, and the optical functional film 40 according to the present invention as mentioned above can be assembled and used in the same manner in a reflection type liquid crystal display. Furthermore, it can be assembled and used in the same manner in the light path of another display device as mentioned above.

Moreover, although the optical functional film 40 according to the present invention as mentioned above is disposed between the liquid crystal cell 104 and the output side polarizing plate 102B in the liquid crystal display 30 shown in FIG. 10, depending on the embodiment of the optical compensation and the function to be provided in a combination, the optical functional film 40 may be disposed between the liquid crystal cell 104 and the incident side polarizing plate 102A. Moreover, the optical functional film 40 may be disposed on the both sides of the liquid crystal cell 104 (between the liquid crystal cell 104 and the incident side polarizing plate 102A, and between the liquid crystal cell 104 and the output side polarizing plate 102B). Further, the optical functional film 40 may be disposed outside (surface side) of the output side polarizing plate 102B. The number of the film to be disposed between the liquid crystal cell 104 and the incident side polarizing plate 102A, or between the liquid crystal cell 104 and the output side polarizing plate 102B, or outside the output side polarizing plate 102B is not limited to one, and a plurality of them may be disposed.

Moreover, a third embodiment of the display device of the present invention has the polarizing film according to the present invention as mentioned above disposed in the light path. Accordingly, a display device having a high reliability and the excellent display quality can be obtained without the need of additionally providing an optical compensating plate.

Figure 11:
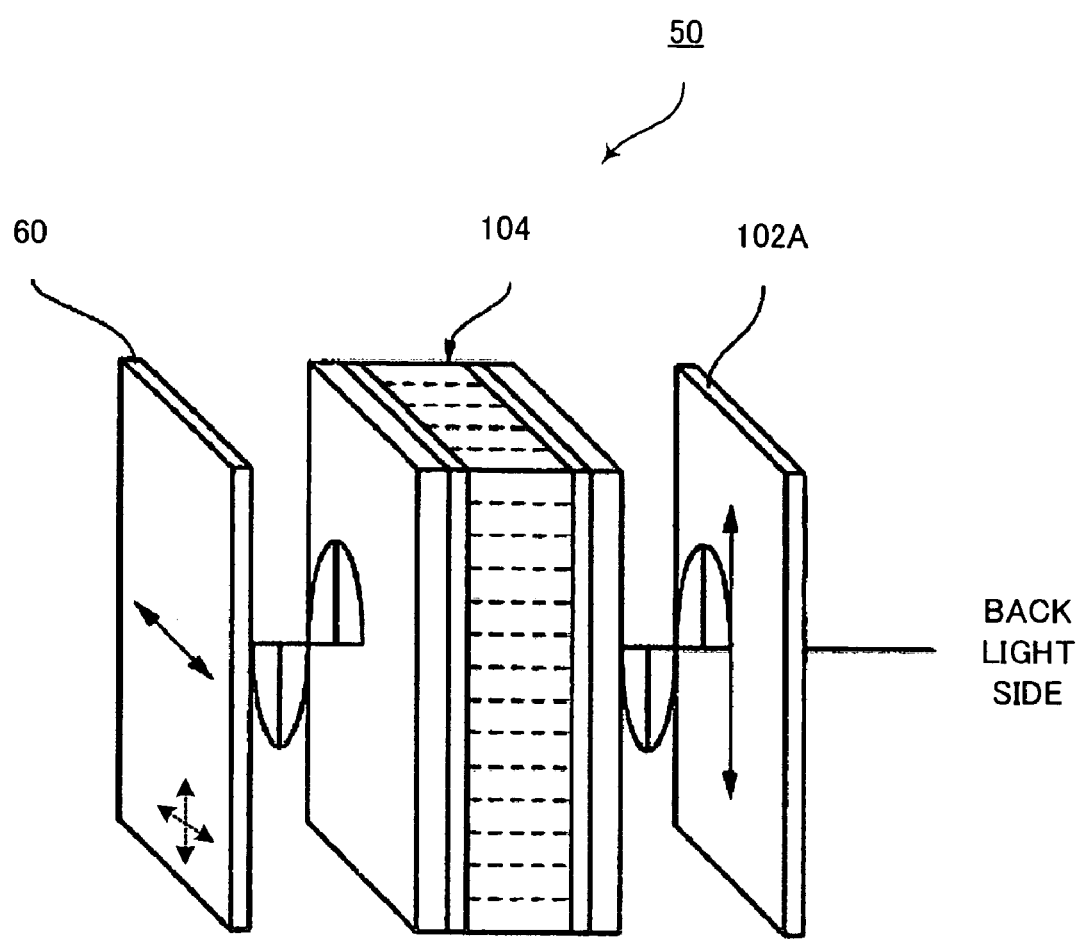
FIG. 11 is a schematic exploded perspective view showing an example of a liquid crystal display comprising a polarizing film of the present invention.

FIG. 11 is a perspective view showing an example of a liquid crystal display as one of the display device of the present invention. As shown in FIG. 11, the liquid crystal display 50 of the present invention comprises an incident side polarizing plate 102A, the polarizing film 60 according to the present invention on the output side, and a liquid crystal cell 104. The polarizing plate 102A and the polarizing film 60 according to the present invention are provided so as to selectively transmit only the linear polarization having an oscillation plane in a predetermined oscillation direction, disposed in a cross nicol state with the oscillating directions perpendicular with each other. Moreover, as the liquid crystal cell 104, one same as that of FIG. 9 can be used, and it is disposed between the polarizing plate 102A and the polarizing film 60 according to the present invention.

In the liquid crystal display 50 having such a configuration, since the highly reliable polarizing film 60 according to the present invention as mentioned above is disposed on the output side of the liquid crystal cell 104 of the liquid crystal display 50 so that the polarizing state of the light beam output in a direction inclined with respect to the normal of the liquid crystal cell 104 among the light beam in the predetermined polarizing state output from the liquid crystal cell 104 can be compensated, the problem of the visual angle dependency in the liquid crystal display 50 can be improved effectively, and since the light leakage from the polarizing plate can be prevented, the excellent display quality and a high reliability can be achieved.

The embodiments of the display device according to the present invention are not limited thereto, and the optical functional film 60 according to the present invention as mentioned above can be assembled and used in the same manner in a reflection type liquid crystal display. Furthermore, it can be assembled and used in the same manner in the light path of another display device as mentioned above.

Moreover, although the polarizing film 60 according to the present invention as mentioned above is disposed on the output side of the liquid crystal cell 104 in the liquid crystal display 50 shown in FIG. 11, depending on the optical compensation embodiment, it may be disposed on the incident side of the liquid crystal cell 104. Moreover, the polarizing films 60 and 60' according to the present invention may be disposed on the both sides of the liquid crystal cell 104. Further, a retardation film may be disposed additionally between the liquid crystal cell 104 and the incident side polarizing plate 102A, or between the liquid crystal cell 104 and the output side polarizing film 60.

Although only the examples of the liquid crystal display have been explained in the description above, the above-mentioned retardation film and polarizing film of the present invention may be used for the other display device. For example, an organic EL display device with the retardation film to function as a circular polarizing plate according to the present invention disposed in the light path, an organic EL display device with the polarizing film according to the present invention disposed in the light path, or the like can be presented as well.

The present invention is not limited to the above-mentioned embodiment. The above-mentioned embodiments are merely examples, and any one having the substantially same configuration and the same effects, as the technological idea disclosed in the scope of the claims of the present invention, is included in the technological scope of the present invention.

EXAMPLES

Hereinafter, the present invention will be explained specifically with reference to the examples.

Example 1

1. Retardation Film Before Orientation

As the refractive index anisotropic material, a photo polymerizable liquid crystal compound (the below-mentioned compound (1)) was dissolved in cyclohexanone by 20% by mass. It was coated onto the surface of a base material film comprising TAC film (manufactured by Fuji Photo Film Co., Ltd., product name: TF80UL) by bar coating so as to have a 2.5 g/m² coating amount after drying. Then, it was heated at 90° C. for 4 minutes so as to dry and remove the solvent as well as the photo polymerizable liquid crystal compound was infiltrated into the TAC film. Furthermore, by irradiating an ultraviolet ray to the coated surface, the above-mentioned photo polymerizable liquid crystal compound was fixed to produce a retardation film before orientation. The obtained retardation film before orientation was used as a sample and evaluated for the below-mentioned items.

(1) Optical Characteristics

Figure 12:
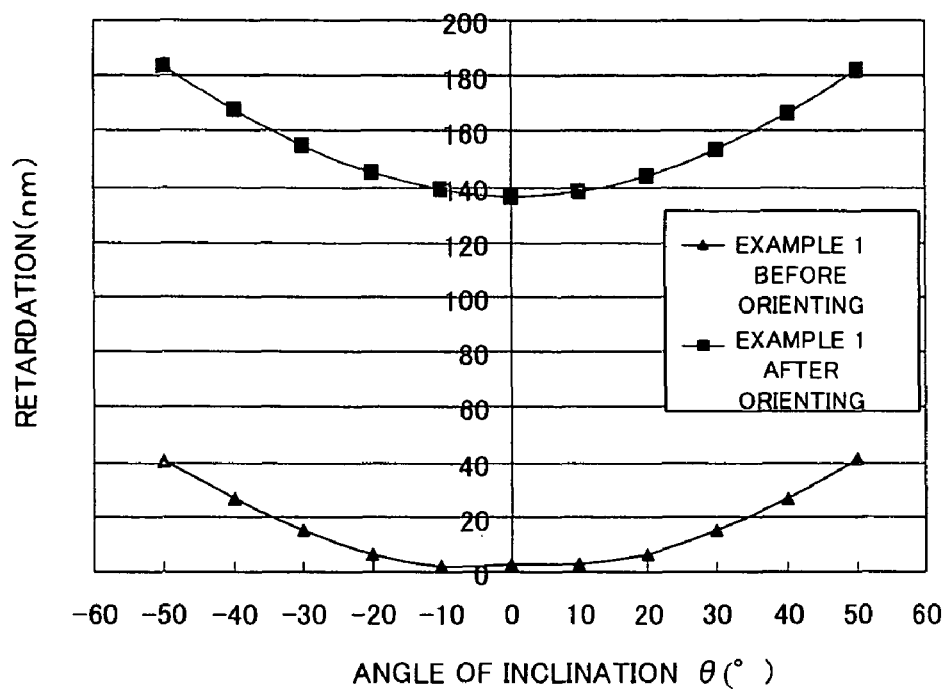
FIG. 12 is a graph showing the retardation angle dependency of the retardation film of the example 1.

The retardation of the sample was measured by an automatic birefringence measuring apparatus (manufactured by Oji Scientific Instruments, product name: KOBRA-21ADH). By introducing the measuring light perpendicularly or obliquely to the sample surface, the anisotropy of increasing the retardation of the base material film was confirmed from a chart of the optical retardation and the incident angle of the measuring light. FIG. 12 shows the retardation angle dependency before orientation. Moreover, by the same measuring apparatus, the three-dimensional refractive index was measured. As a result, with the premise that the refractive indices in the plane direction parallel to the surface of the base material film are nx, ny, and the refractive index in the thickness direction is nz, nz<nx=ny is satisfied as shown in the below-mentioned Table 1 so as to provide a negative C plate. Therefore, combining this result with the above-mentioned measuring results of the retardation, the liquid crystal molecules are considered to be aligned homogeneously which is randomly arranged in the plane with the presence of the liquid crystal molecules in the plane parallel to the surface of the base material film.

TABLE 1

| nx | 1.63 |
| ny | 1.63 |
| nz | 1.53 |

(2) Cross Section Observation by SEM

Figure 13:
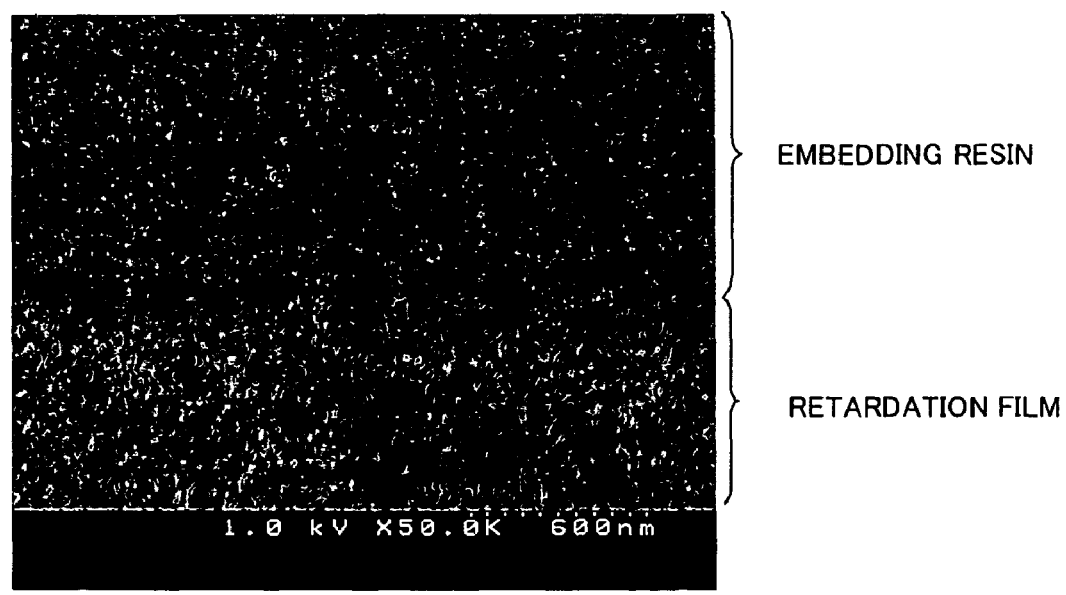
FIG. 13 is a SEM photograph showing a cross section of the retardation film before orienting of the example 1.

An embedding resin was coated on the liquid crystal coated surface of the sample. It was cut in the thickness direction, and the cross section of the sample was observed by the SEM. The results are shown in FIG. 13. As it is apparent from FIG. 13, there was no layer present between the film surface and the embedding resin. Therefore, combining this result with the above-mentioned measuring results of the retardation, it was judged that the liquid crystal compound was infiltrated into the polymer film.

(3) Cross Section Observation by TEM

Figure 14:
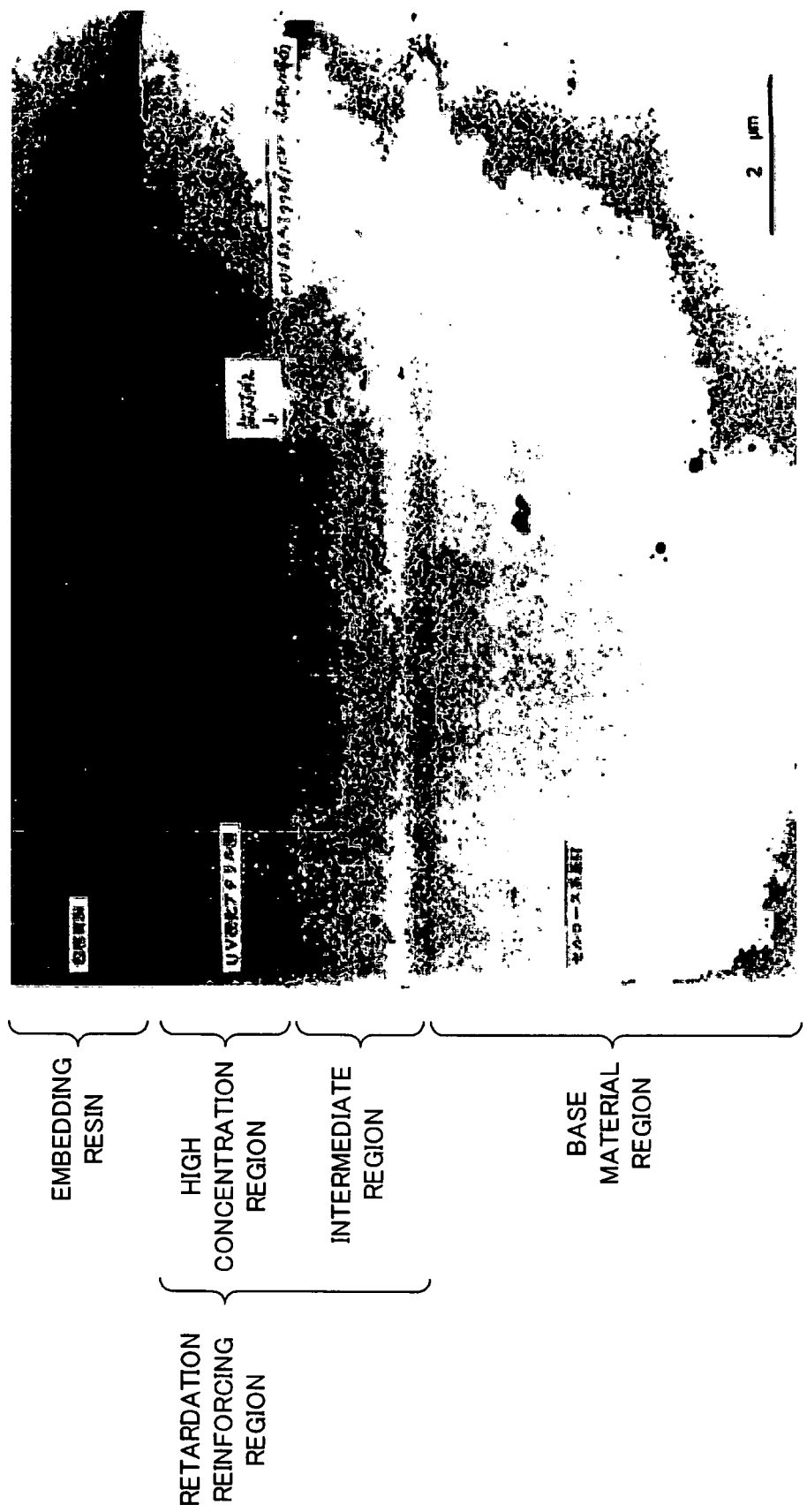
FIG. 14 is a TEM photograph showing a cross section of the retardation film before orienting of the example 1.

A surface protection of the liquid crystal coated surface of the sample was carried out by coating with a metal oxide. After embedding the sample with an epoxy resin, it was bonded onto a cryo supporting platform. Then, it was trimmed and figured by a cryo system with a diamond knife installed ultra microtome. It was subjected to a vapor dying by the metal oxide, an ultra thin piece was produced, and then, the TEM observation was carried out. Results are shown in FIG. 14. As it is apparent from FIG. 14, it was found out that the refractive index anisotropic material infiltrated side of the sample was separated into three layers (a high concentration region out of the retardation reinforcing region, an intermediate region out of the retardation reinforcing region, and a base material region).

(4) Material Concentration Distribution Measurement in the Thickness Direction

With the retardation film cut by the GSP (gradient shaving preparation) so as to provide the cross section in the thickness direction, the concentration distribution of the material in the

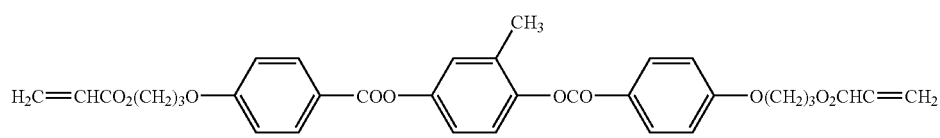

(1)

thickness direction in the cut surface was measured using a Time of Flight Secondary Ion Mass Spectrometry (TOF-SIMS) (device: TFS-2000 manufactured by Physical electronics Corp.). The measurement conditions include the secondary ion polarity of positive and negative, the mass range (M/Z) of 0 to 1,000, the raster size of 180 μm□, the measurement time of 3 minutes, no energy filter, the contrast diaphragm of 0#, the post stage acceleration of 5 kV, the measurement vacuum degree of $4\times10^{-7}$ Pa ($3\times10^{-9}$ Torr), the primary ion species of $Ga^+$, the primary ion energy of 25 kV, the specimen potential of +3.2 kV, the pulse frequency of 8.3 kHz, the pulse width of 12 ns, no bunching, with charge neutralization and the time resolution of 1.1 ns/ch.

Figure 15:
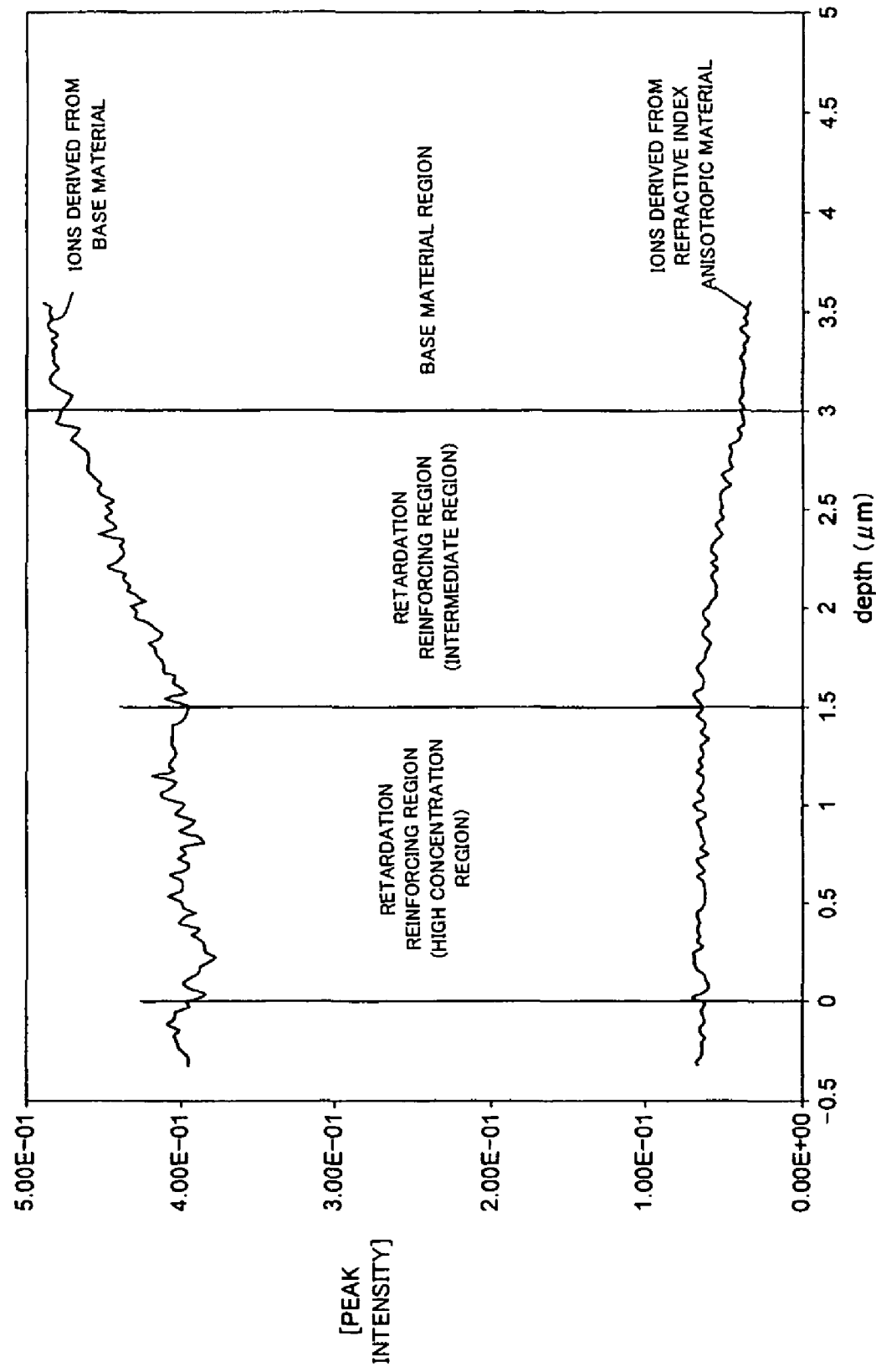
FIG. 15 is a graph showing the concentration distribution by the positive secondary ion spectrum measurement of the TOF-SIMS measurement of the retardation film before orienting of the example 1.

As the measurement result, using 27, 55, 104, 121, 275 amu measured strongly on the refractive index anisotropic material coating surface provided as the peaks derived from the refractive index anisotropic material in the positive secondary ion spectrum and using 15, 43, 327 amu measured strongly on the rear surface without coating provided as the peaks derived from the TAC film, FIG. 15 shows a profile obtained by plotting, in the vertical axis, the value of the each sum of the above-mentioned peak intensities normalized by the total secondary ion intensity, and in the lateral axis, the thickness direction with the coating surface of the refractive index anisotropic material provided as zero. However, since 27, 55 amu were observed also from the TAC film, the positive secondary ion with the peaks derived from the refractive index anisotropic material includes partially the contribution of the TAC film.

Figure 16:
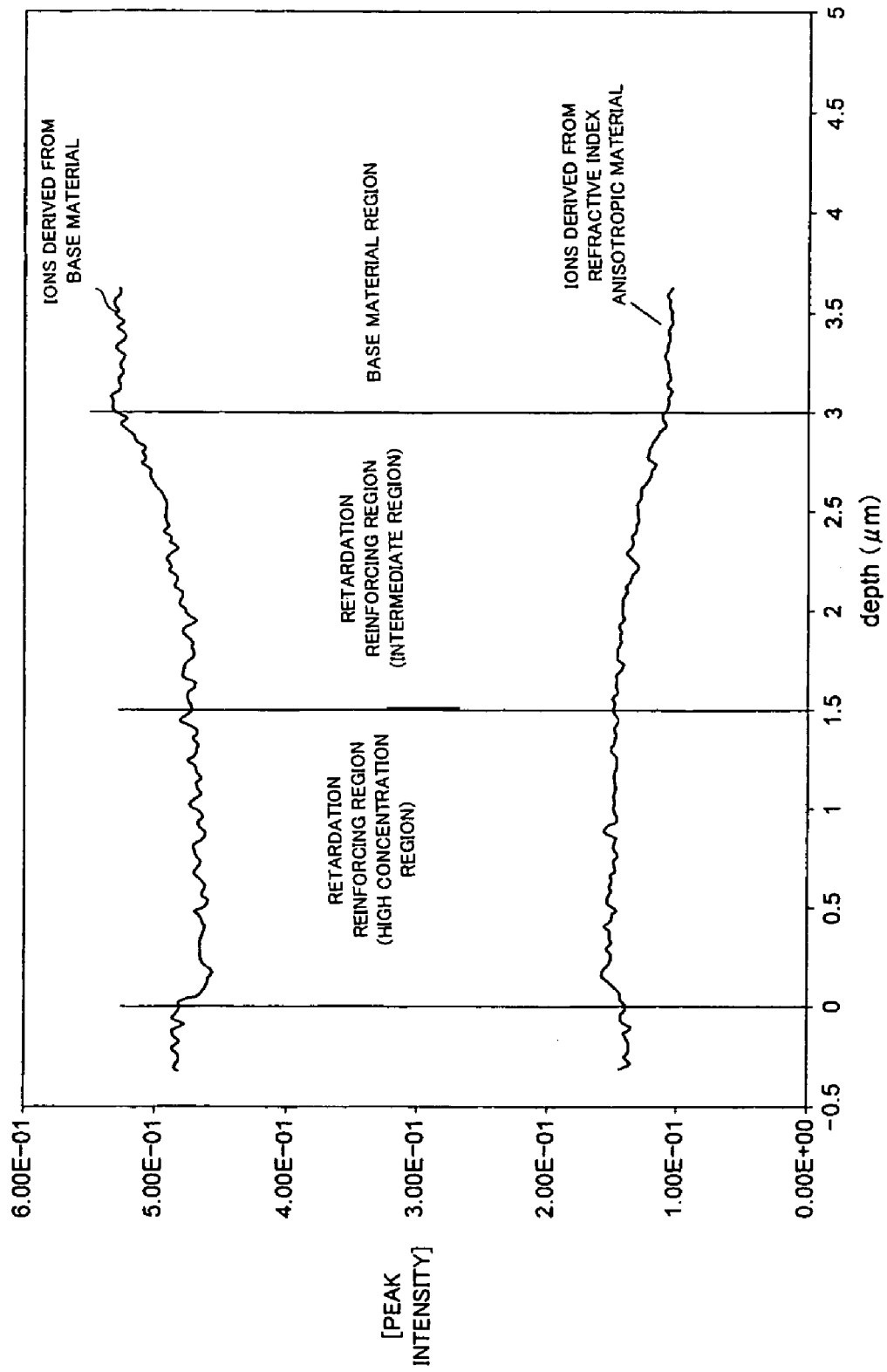
FIG. 16 is a graph showing the concentration distribution by the negative secondary ion spectrum measurement of the TOF-SIMS measurement of the retardation film before orienting of the example 1.

Moreover, in the same manner, using 13, 26, 118, 217 amu measured strongly in the refractive index anisotropic material coating surface provided as the peaks derived from the refractive index anisotropic material in the negative secondary ion spectrum and using 16, 59 amu measured strongly on the rear surface without coating provided as the peaks derived from the TAC film, FIG. 16 shows a profile obtained by plotting, in the vertical axis, the value of the each sum of the above-mentioned peak intensities normalized by the total secondary ion intensity, and in the lateral axis, the thickness direction with the coating surface of the refractive index anisotropic material provided as zero. However, since 13 amu was observed also from the TAC film, the negative secondary ion with the peaks derived from the refractive index anisotropic material includes partially the contribution of the TAC film.

According to the results of the thickness direction profiles of the positive secondary ion spectrum and the negative secondary ion spectrum, it was revealed that a region having a relatively high concentration of the refractive index anisotropic material and a gentle concentration gradient is provided from the coating surface to about 1.5 μm in both cases, a region having a steep concentration gradient with the refractive index anisotropic material concentration attenuated is present at about 1.5 μm to about 3 μm, and furthermore, a base material region hardly containing the refractive index anisotropic material is further present from about 3 μm. This coincides with the result of the cross section observation by the TEM, wherein the refractive index anisotropic material infiltration side is separated into three layers (a high concentration region out of the retardation reinforcing region, an intermediate region out of the retardation reinforcing region, and a base material region). The concentration distributions are assumed to be similar to the film after orientation.

II. Retardation Film After Orientation

The above-mentioned retardation film before orientation was heated at 120° C. for 5 minutes on a hot plate so as to be oriented by a 1.20 times stretching ratio. The obtained retardation film after orientation was used as a sample and evaluated for the below-mentioned items.

(1) Optical Characteristics

The retardation of the sample after orientation was measured by an automatic birefringence measuring apparatus (manufactured by Oji Scientific Instruments, product name: KOBRA-21ADH). By introducing the measuring light perpendicularly or obliquely to the sample surface, the anisotropy of increasing the retardation of the base material film was confirmed from a chart of the optical retardation and the incident angle of the measuring light. FIG. 12 shows also the retardation angle dependency after orientation. Moreover, by the same measuring apparatus, the three-dimensional refractive index was measured. Results thereof are shown in the Table 2. As a result, it was revealed that the sample after orientation has the functions of a positive A plate by the realization of the in-plane direction retardation in addition to a negative C plate so that with the premise that the refractive indices in the plane direction parallel to the surface of the base material film are Nx, Ny, and the refractive index in the thickness direction is Nz, Nx>ny>nz is satisfied.

TABLE 2

| | |
|---|---|
| nx | 1.60 |
| ny | 1.58 |
| nz | 1.52 |

(2) Haze

To examine the transparency of the sample, the haze value was measured by a turbidimeter (manufactured by Nippon Denshoku Industries Co., Ltd., product name: NDH2000) in accordance with the JIS-K7136. The result was 0.35%, which is preferable.

(3) Adhesion Test

To examine the adhesion, a peeling test was carried out. The peeling test was carried out as follows. Cuts of 1 mm width grid were made on the obtained sample. An adhesive tape (manufactured by NICHIBAN CO., LTD., Sellotape (registered trademark)) was bonded on the liquid crystal surface, the tape was peeled off and it was observed visually. As a result, the adhesion degree was 100%.

Adhesion degree (%)=(part which was not peeled off/tape-bonded region)×100

(4) Humidity and Heat Resistance Test

After soaking the sample in hot water of 90° C. for 60 minutes, the optical characteristics and the adhesion were measured by the above-mentioned methods. As a result, comparing before and after the test, no change of the optical characteristics and the adhesion was observed.

(5) Water Resistance Test

After soaking the sample in pure water for one day under the room temperature (23.5° C.), optical characteristics and the adhesion were measured by the above-mentioned methods. As a result, comparing before and after the test, no change of the optical characteristics and the adhesion was observed.

(6) Alkaline Resistance Test

The sample was soaked in an alkaline aqueous solution (sodium hydroxide aqueous solution of 1.5 N) under 55° C. for 3 minutes, washed with water, and dried. Then, the optical characteristic and the adhesion property were measured by the above-mentioned methods. As a result, change of the optical characteristic and the adhesion property was not observed before and after the test. Moreover, no coloring was observed as well.

(7) Contact Angle Measurement

The contact angles of the retardation reinforcing region surface and the base material region surface of the retardation film were measured. Specifically, the contact angles of the retardation reinforcing region surface and the base material region surface (TAC surface) to pure water were measured by a contact angle measuring device (manufactured by Kyowa Interface Science Co., LTD., CA-Z type). The contact angle was measured 30 seconds after dropping 0.1 ml of pure water onto the measuring surface. As a result, the contact angle of the retardation reinforcing region surface was 62.6° and the contact angle of the base material region surface was 57.3°. The retardation reinforcing region surface has a higher value, leading to a result that the surface of the region other than the retardation reinforcing region has higher hydrophilic property.

Example 2

9 samples of the retardation films before orientation were produced in the same manner as in the example 1 except that the coating operation was executed so as to have the coating amount after drying of 1.2, 1.5, 1.9, 2.5, 3.0, 3.5, 4.9, 5.4 and 5.9 g/m². Thereafter, by orienting the retardation films before orientation in the in-plane direction so as to have the 1.1 times stretching ratio by the stretching experiment device, 9 retardation film samples were produced. The retardation values were measured, and the relationship between the coating amount and the retardation value at the time of having a constant stretching ratio was evaluated. Moreover, for each sample, the haze value was measured in the same manner as in the example 1.

Figure 17A:
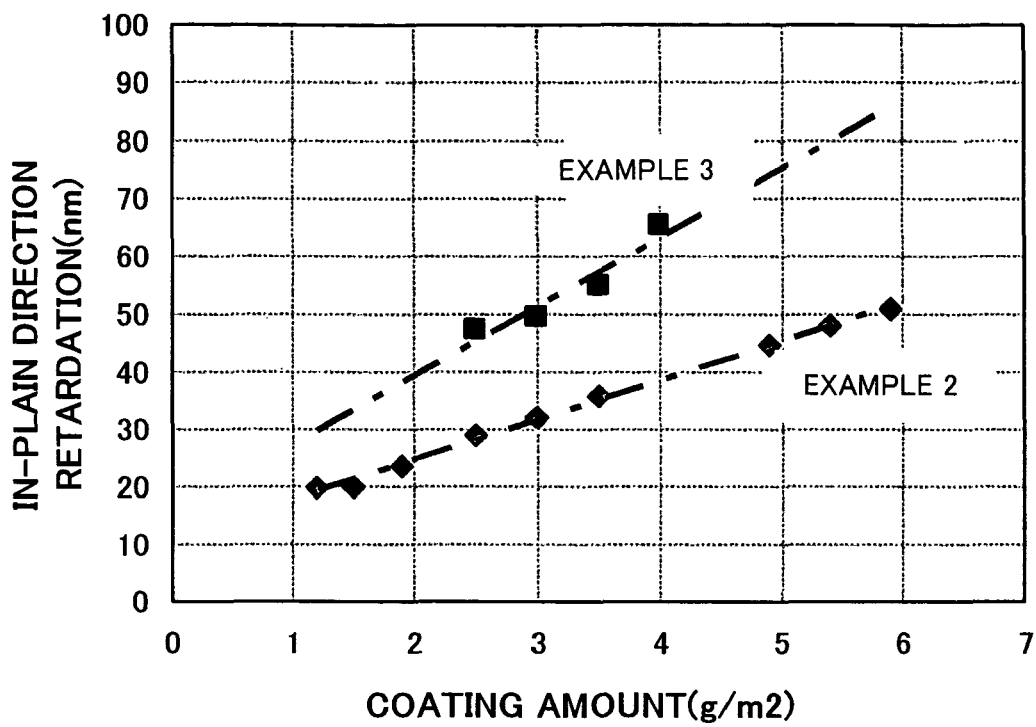
FIGS. 17A to 17B are graphs respectively showing the in-plane direction retardation value with respect to the coating amount of the retardation films of the examples 2 and 3 (FIG. 17A), and the thickness direction retardation value with respect to the coating amount of the retardation films of the examples 2 and 3 (FIG. 17B).
Figure 17B:
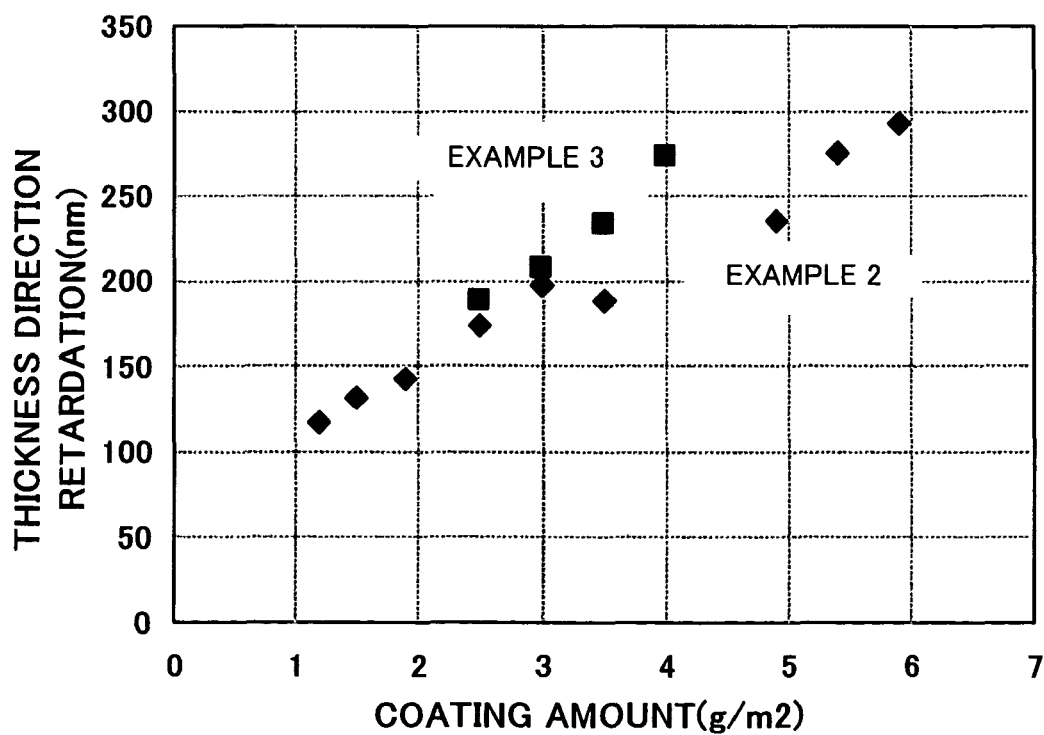

FIG. 17A shows the relationship between the coating amount and the in-plane direction retardation value, and FIG. 17B shows the relationship between the coating amount and the thickness direction retardation value. From the results, it was found out that the coating amount and the in-plane direction retardation, and the coating amount and the thickness direction retardation, respectively have the relationship nearly proportional as shown in FIGS. 17A and 17B so that the retardation can be controlled according to the coating amount. Moreover, as to the haze value, the all haze values in the example 2 were 0.6% or less so that the depolarization was extremely small.

Example 3

As the refractive index anisotropic material, a photo polymerizable rod like liquid crystal mixture (a mixture of a rod like liquid crystal compound having a polymerizable functional group on the both ends, a rod like liquid crystal compound having a polymerizable functional group on one end, and a rod like liquid crystal compound having no polymerizable functional group) was dissolved in cyclohexanone by 20% by mass. It was coated onto the surface of a base material film comprising TAC film (manufactured by Fuji Photo Film Co., Ltd., product name: TF80UL) by bar coating so as to have a 2.5, 3.0, 3.5, 4.0 g/m² coating amount after drying. Then, it was heated at 90° C. for 4 minutes so as to dry and remove the solvent as well as the photo polymerizable liquid crystal mixture was infiltrated into the TAC film. Furthermore, by irradiating an ultraviolet ray to the coated surface, the above-mentioned photo polymerizable liquid crystal mixture was fixed to produce a retardation film before orientation. Thereafter, by orienting the retardation films before orientation in the in-plane direction so as to have the 1.1 times stretching ratio by the stretching experiment device, 4 retardation film samples were produced. The retardation values were measured, and the relationship between the coating amount and the retardation value at the time of having a constant stretching ratio was evaluated. Moreover, for each sample, the haze value was measured in the same manner as in the example 1.

FIG. 17A shows the relationship between the coating amount and the in-plane direction retardation value, and FIG. 17B shows the relationship between the coating amount and the thickness direction retardation value together with those of the example 2. From the results, it was found out that the coating amount and the in-plane direction retardation, and the coating amount and the thickness direction retardation, respectively have the relationship nearly proportional as shown in FIGS. 17A and 17B so that the retardation can be controlled according to the coating amount. Moreover, as to the haze value, the all haze values in the example 3 were 0.4% or less so that the depolarization was extremely small.

Example 4

Retardation films before orientation were produced in the same manner as in the example 1 except that the coating amount after drying was 3.5 g/m². Thereafter, by orienting the retardation films before orientation (1.00 time) so as to have the 1.10 times and 1.20 times stretching ratios by the stretching experiment machine, retardation film samples were produced. The retardation values were measured, and the relationship between the stretching ratio and the retardation value at the time of having a constant coating amount was evaluated. Moreover, for each sample, the haze value was measured in the same manner as in the example 1.

Figure 18A:
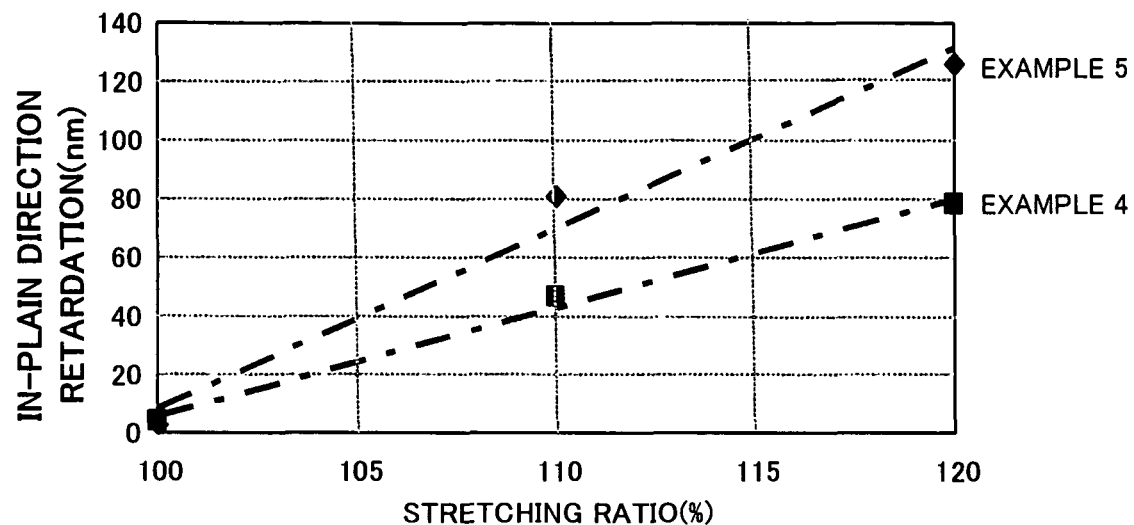
FIGS. 18A to 18B are graphs respectively showing the in-plane direction retardation value with respect to the stretching ratio of the retardation films of the examples 4 and 5 (FIG. 18A), and the thickness direction retardation value with respect to the stretching ratio of the retardation films of the examples 4 and 5 (FIG. 18B).
Figure 18B:
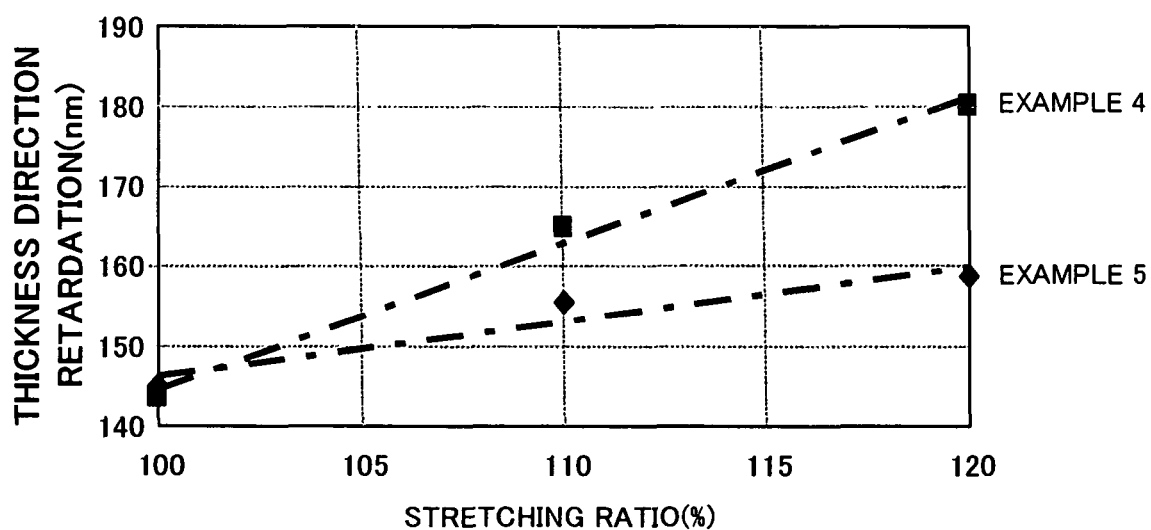

FIG. 18A shows the relationship between the stretching ratio and the in-plane direction retardation value, and FIG. 18B shows the relationship between the stretching ratio and the thickness direction retardation value. From the results, it was found out that the coating amount and the in-plane direction retardation, and the coating amount and the thickness direction retardation, respectively have the relationship nearly proportional as shown in FIGS. 18A and 18B so that the retardation can be controlled according to the orientation. Moreover, as to the haze value, the all haze values in the example 4 were 0.8% or less so that the depolarization was extremely small.

Example 5

As the refractive index anisotropic material, the same photo polymerizable liquid crystal compound as in the example 1 (the above-mentioned compound (1)) was dissolved in cyclohexanone by 20% by mass. It was coated onto the surface of a base material film comprising TAC film (manufactured by Fuji Photo Film Co., Ltd., product name: TF80UL) by bar coating so as to have a 3.5 g/m² coating amount after drying. Then, it was heated at 90° C. for 4 minutes so as to dry and remove the solvent as well as the photo polymerizable liquid crystal compound was infiltrated into the TAC film. Thereafter, by orienting the films (1.00 time) so as to have the 1.10 times and 1.20 times stretching ratios by the stretching experiment device, retardation film samples were produced. Furthermore, for each retardation film sample, by irradiating an ultraviolet ray to the coated surface in the same condition as in the example 4, the above-mentioned photo polymerizable liquid crystal compound was fixed so as to produce the retardation film samples. The retardation values were measured, and the relationship between the stretching ratio and the retardation value at the time of having a constant coating amount was evaluated. Moreover, for each sample, the haze value was measured in the same manner as in the example 1.

FIG. 18A shows the relationship between the stretching ratio and the in-plane direction retardation value, and FIG. 18B shows the relationship between the stretching ratio and the thickness direction retardation value together with the example 4. From the results, it was found out that that the coating amount and the in-plane direction retardation, and the coating amount and the thickness direction retardation, respectively have the relationship nearly proportional as shown in FIGS. 18A and 18B so that the retardation can be controlled according to the orientation. Moreover, as to the haze value, the all haze values in the example 5 were 0.7% or less so that the depolarization was extremely small.

As it is shown in FIGS. 18A and 18B, according to the comparison of the example 4 and the example 5, it was found out that the retardation value differs depending on the order of the orientation process and the fixing process even for the same coating amount and the same stretching ratio. In the example 5 of orienting the refractive index anisotropic material before fixation, the in-plane direction retardation of the retardation film can be made larger according to the orientation process.

Example 6

As the refractive index anisotropic material, the same photo polymerizable liquid crystal compound as in the example 1 (the above-mentioned compound (1)) was dissolved in acyclohexanone by 20% by mass. It was coated onto the surface of a long base material film comprising TAC film having a 650 mm width and a 30 m length size (manufactured by Fuji Photo Film Co., Ltd., product name: TF80UL) so as to have a 3 g/m² coating amount after drying. Then, it was heated at 90° C. for 4 minutes so as to dry and remove the solvent as well as the photo polymerizable liquid crystal compound was infiltrated into the TAC film. Furthermore, by irradiating an ultraviolet ray to the coating surface, the photo polymerizable liquid crystal compound was fixed so as to produce the retardation films before orientation. Thereafter, by orienting the retardation films before orientation so as to have the 1.2 times lateral stretching ratio by the lateral stretching machine, retardation films of the present invention were produced. The long retardation film cut out by 3 m was stored for 1 month at 23° C. in a form rolled into a cylindrical form with a 31 mm minimum diameter. As a result, no change was observed in the surface of the retardation films before and after the storage without crack generation or sticking between the rolled films.

Experiment Example 1

Figure 19:
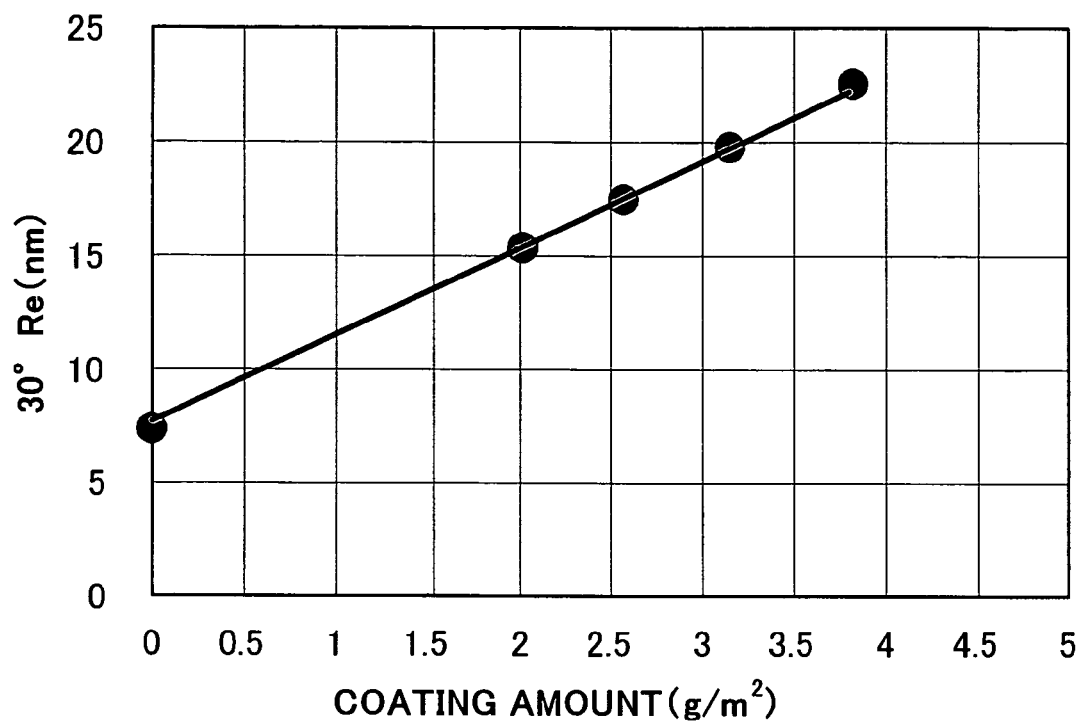
FIG. 19 is a graph showing the relationship between the coating amount and the retardation in the example 1.

Retardation film before orientation samples were produced in the same manner as in the example 1 except that the coating amount after drying was changed to 2.0, 2.6, 3.2 and 3.8 g/m² so as to evaluate the relationship between the coating amount and the retardation. As a result, a linear relationship was found between the coating amount and the retardation (the retardation value measured by a 30° angle with respect to the normal direction: 30° Re) as shown in FIG. 19, so that it was revealed that the retardation can be controlled by the coating amount.

Industrial Applicability

The retardation film of the present invention can be used for various applications as the optical functional film. Specifically, an optical compensating plate (for example, a visual angle compensating plate), an elliptical polarization plate, a brightness improving plate and the like can be presented. Among them, the application as the optical compensating plate is particularly preferable. Specifically, it can be used for the application as a biaxial optical compensating plate having the functions of both a negative C plate and a positive A plate by using a TAC film as the polymer film, using a liquid crystalline compound, whose molecular structure is in a shape of a rod, as the refractive index anisotropic material and orienting the film at any point in time.

What is claimed is:

1. A single layer retardation film, consisting of a polymer film containing a material having refractive index anisotropy, wherein the material having refractive index anisotropy has a concentration gradient in a thickness direction of the polymer film, the polymer film is oriented, and the oriented polymer film has
    a retardation value, in a visible light range, on the shorter wavelength side that is larger than that of the longer wavelength side.

2. The single layer retardation film according to claim 1, which has refractive indices satisfying the condition of nx>ny>nz, wherein nx is a refractive index along a slow axis in plane of the film, ny is a refractive index along a fast axis in plane of the film, and nz is a refractive index along a thickness direction of the film.

3. The single layer retardation film according to claim 1, which has a direction of a principal refractive index inclined with respect to in-plane directions of the film and a thickness direction of the film.

4. The single layer retardation film according to claim 1, wherein the polymer film has regularity in the refractive index.

5. The single layer retardation film according to claim 1, wherein the material having refractive index anisotropy is a material having liquid crystallinity.

6. The single layer retardation film according to claim 1, wherein the molecular structure of the material having refractive index anisotropy is in a shape of a rod.

7. The single layer retardation film according to claim 1, wherein the material having refractive index anisotropy has a polymerizable functional group.

8. The single layer retardation film according to claim 1, wherein the material having refractive index anisotropy comprises a material having a polymerizable functional group and a material having no polymerizable functional group.

9. The single layer retardation film according to claim 1, wherein the concentration gradient of the material having refractive index anisotropy in a thickness direction of the polymer film has high concentration on one surface side of the polymer film and becomes low concentration toward the other surface side.

10. The single layer retardation film according to claim 9, wherein contact angles of the retardation film to pure water are different between one surface and the other surface.

11. The single layer retardation film according to claim 1, wherein the concentration gradient of the material having refractive index anisotropy in a thickness direction of the polymer film has high concentration on both surface sides of the polymer film and becomes low concentration toward a central part.

12. The single layer retardation film according to claim 1, wherein the concentration gradient of the material having refractive index anisotropy in a thickness direction of the polymer film vanes continuously.

13. The single layer retardation film according to claim 1, which has a region in which the concentration gradient of the material having refractive index anisotropy is gentle and a region in which the concentration gradient of the material having refractive index anisotropy is steep.

14. The single layer retardation film according to claim 1, which has a region containing no material having refractive index anisotropy.

15. The single layer retardation film according to claim 1, which shows a thickness direction retardation of 100 to 300 nm and a in-plane direction retardation of 10 to 150 nm, wherein the thickness direction retardation is represented by the following Rth, $$Rth[nm]=\{(nx+ny)/2-nz\}\times d,$$ and the in-plane direction retardation is represented by the following Re, $$Re[nm]=(nx-ny)\times d,$$

wherein nx is a refractive index along a slow axis in plane of the film, ny is a refractive index along a fast axis in plane of the film, nz is a refractive index along a thickness direction of the film and d is the thickness of the film.

16. The single layer retardation film according to claim 1, which shows an in-plane direction retardation of 10 to 150 nm and has a haze value of 1% or less measured in accordance with JIS-K7105.

17. The single layer retardation film according to claim 1, which is capable of being rolled into a cylindrical form having a minimum diameter of 6 inches or less.

18. A retardation film comprising two or more sheets of the single layer retardation film, according to claim 1, laminated together.

19. An optical functional film, comprising the single layer retardation film according to claim 1 directly laminated to an optical functional layer other than a retardation film.

20. A display device comprising the optical functional film according to claim 19 disposed in a light path of the display device.

21. A polarizing film, comprising the single layer retardation film according to claim 1 directly laminated to a polarizing layer.

22. A display device comprising the polarizing film according to claim 21 disposed in a light path of the display device.

23. A display device comprising the single layer retardation film according to claim 1 disposed in a light path of the display device.

24. A method for producing a retardation film comprising:
   a coating process of coating a retardation reinforcing region forming coating solution, in which a material having refractive index anisotropy is dissolved or dispersed in a solvent, on at least one surface of a polymer film;
   an infiltration process of infiltrating the material having the refractive index anisotropy, in the retardation reinforcing region forming coating solution coated in the coating process, into the polymer film;
   a drying process of drying the solvent in the retardation reinforcing region forming coating solution coated in the coating process; and
   an orientation process of orienting the polymer film; wherein the oriented polymer film is a single layer retardation film which has a retardation value, in a visible light range, on the shorter wavelength side that is larger than that of the longer wavelength side, and the material having refractive index anisotropy has a concentration gradient in a thickness direction of the oriented polymer film.

25. The method for producing a retardation film according to claim 24, wherein the infiltration process is carried out during the drying process.

26. The method for producing a retardation film according to claim 24, further comprising, as a process after the drying process, a fixing process of fixing the refractive index anisotropic material infiltrated into the polymer film.

27. The method for producing a retardation film according to claim 26, the orientation process of orienting the polymer film is carried out after the fixing process.

28. The method for producing a retardation film according to claim 24, the orientation process of orienting the polymer film is carried out after the drying process.

29. The method for producing a retardation film according to claim 28, further comprising, as a process after the orientation process, a fixing process of fixing the refractive index anisotropic material infiltrated into the polymer film.

30. The method for producing a retardation film according to claim 24, the coating process of coating a retardation reinforcing region forming coating solution is carried out after the orientation process of orienting the polymer film.

* * * * *